(12) United States Patent
Motosugi et al.

(10) Patent No.: US 7,627,412 B2
(45) Date of Patent: Dec. 1, 2009

(54) AUTOMATIC BRAKING FORCE CONTROL APPARATUS

(75) Inventors: Jun Motosugi, Kanagawa (JP); Hiroyuki Ashizawa, Yokohama (JP); Kazuhiko Tazoe, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 995 days.

(21) Appl. No.: 11/111,959

(22) Filed: Apr. 22, 2005

(65) Prior Publication Data
US 2005/0246086 A1 Nov. 3, 2005

(30) Foreign Application Priority Data
Apr. 23, 2004 (JP) .............................. 2004-128585

(51) Int. Cl.
*B60B 39/00* (2006.01)
(52) U.S. Cl. .............................. 701/71; 701/70; 701/78; 701/79; 701/80; 701/82; 303/155; 303/158; 303/191; 180/197
(58) Field of Classification Search ................... 701/70, 701/78, 79, 80, 82; 303/155, 158, 191; 180/197
See application file for complete search history.

(56) References Cited

U.S. PATENT DOCUMENTS

| | | | | | |
|---|---|---|---|---|---|
| 3,520,575 | A | * | 7/1970 | Steigerwald | 303/126 |
| 3,829,167 | A | | 8/1974 | Rouf et al. | |
| 4,327,414 | A | * | 4/1982 | Klein | 701/79 |
| 4,743,072 | A | * | 5/1988 | Brearley | 303/15 |
| 5,007,516 | A | * | 4/1991 | Miyazaki | 192/72 |
| 5,242,216 | A | * | 9/1993 | Miyawaki et al. | 303/167 |
| 5,511,862 | A | * | 4/1996 | Fujioka | 303/113.4 |
| 5,556,177 | A | * | 9/1996 | Harris et al. | 303/174 |
| 5,833,327 | A | * | 11/1998 | Kozakai | 303/113.4 |
| 5,890,776 | A | * | 4/1999 | Sawada | 303/116.1 |
| 5,913,576 | A | * | 6/1999 | Naito et al. | 303/112 |
| 6,161,641 | A | * | 12/2000 | Fukumura et al. | 180/197 |
| 6,490,518 | B1 | * | 12/2002 | Walenty et al. | 701/71 |
| 7,364,196 | B2 | * | 4/2008 | Akutagawa et al. | 280/757 |
| 2002/0120383 | A1 | * | 8/2002 | Miyazaki | 701/80 |
| 2003/0182045 | A1 | * | 9/2003 | Miyazaki | 701/70 |
| 2003/0218379 | A1 | * | 11/2003 | Miyazaki | 303/150 |

FOREIGN PATENT DOCUMENTS

JP 56-33254 B2 8/1981

* cited by examiner

*Primary Examiner*—Khoi Tran
*Assistant Examiner*—Nikhil Sriraman
(74) *Attorney, Agent, or Firm*—Foley & Lardner LLP

(57) ABSTRACT

In an automatic braking force control apparatus for a vehicle employing a deceleration feedback control system and an anti-skid control system executing, irrespective of a desired braking force for deceleration feedback control, an anti-skid cycle for preventing a wheel lock-up condition, the feedback control system calculates a desired braking force as a sum of a proportional-control signal component proportional to an error signal corresponding to a deviation from a desired deceleration, and an integral-control signal component corresponding to the integral of the error signal. The feedback control system memorizes the desired braking force, calculated just before an anti-skid cycle start time, as a memorized value, and initializes the desired braking force of an anti-skid cycle termination time to a predetermined value substantially corresponding to the memorized value for preventing a change in the desired deceleration occurring during the anti-skid cycle from being reflected in a feedback control signal.

22 Claims, 12 Drawing Sheets

FIG.5A
MASTER-
CYLINDER
PRESSURE
(Pmc)
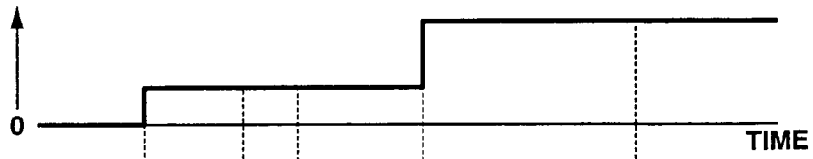
FIG.5B
ANTI-SKID
BRAKING
SYSTEM (ABS)
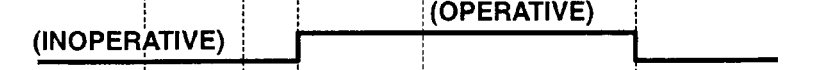
FIG.5C
ROAD-
SURFACE
FRICTION
FACTOR μ
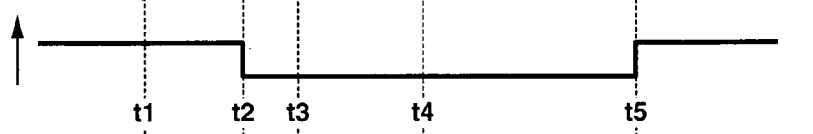
FIG.5D
ACTUAL
DECELERATION
(αv)
DESIRED
DECELERATION
(αdem)
(GREATER
DECELERATION)
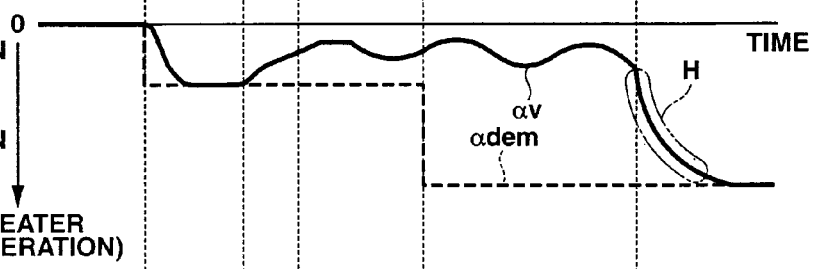
FIG.5E
ACTUAL
BRAKING
FORCE Td
(BRAKING
TORQUE)
DESIRED
BRAKING
FORCE Tdcom
(BRAKING
TORQUE)
(GREATER
BRAKING FORCE)
FIG.5F
INTEGRAL-
CONTROL SIG.
COMPONENT
(Iout)
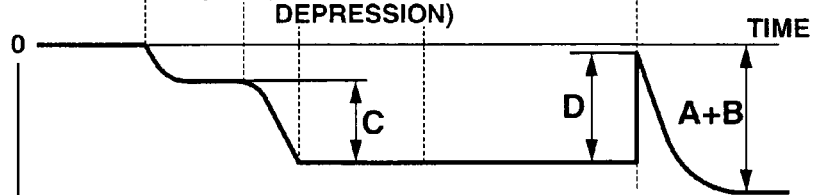
(GREATER
BRAKING FORCE)

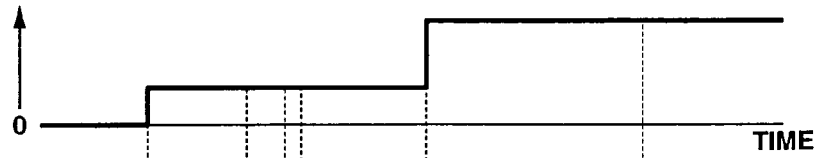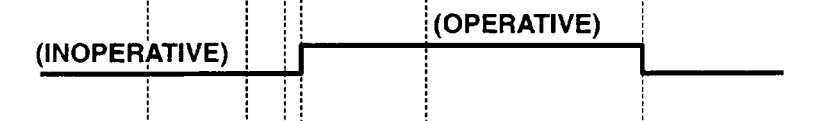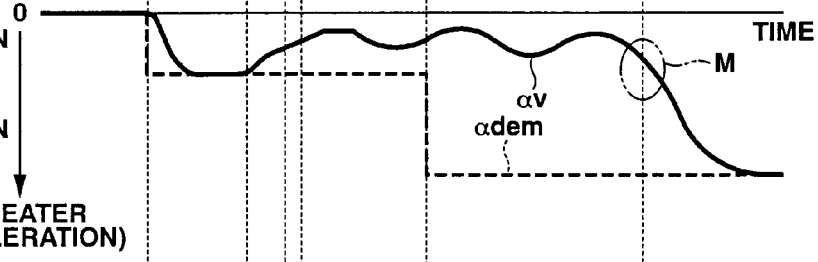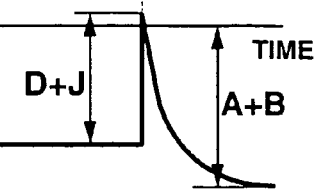

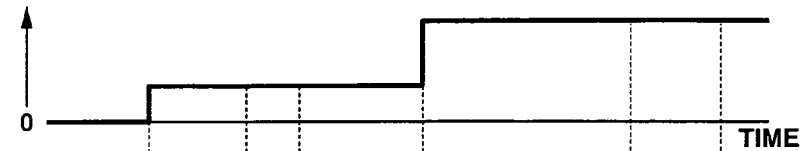
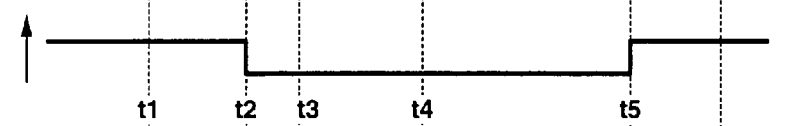
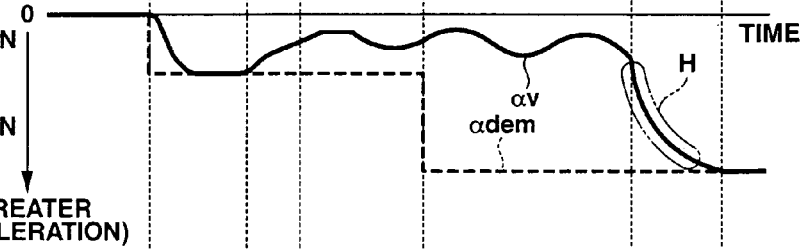
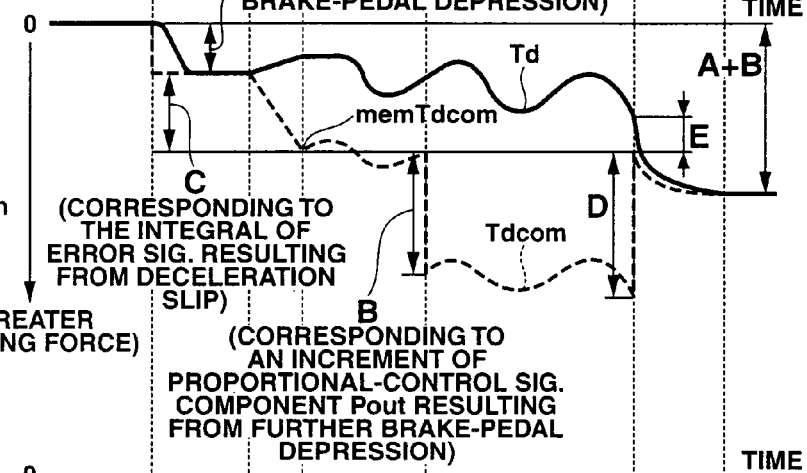
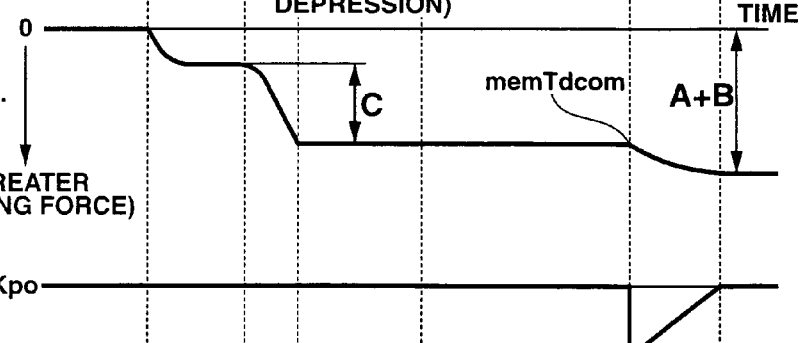
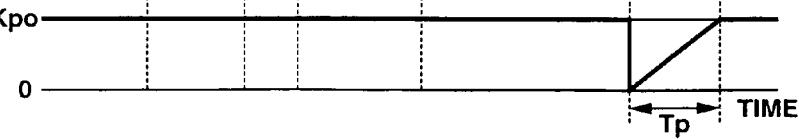

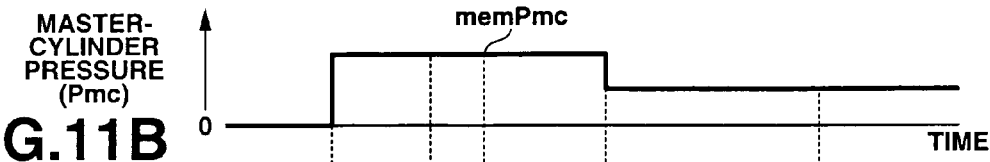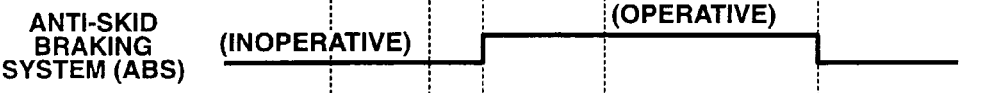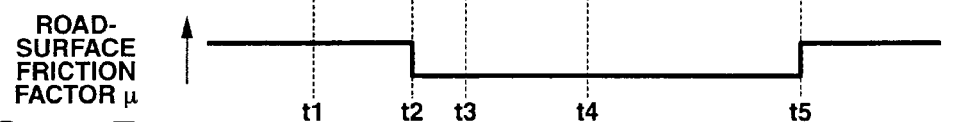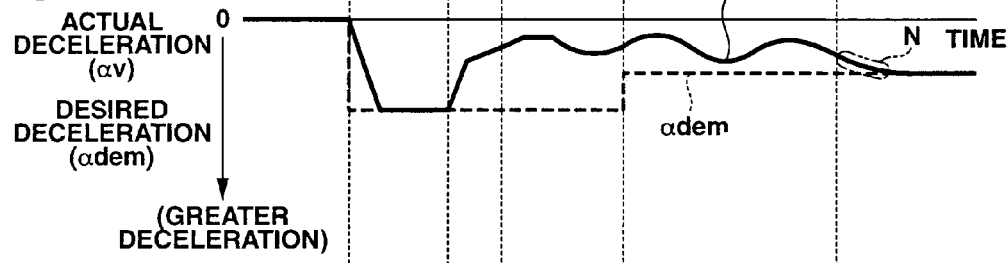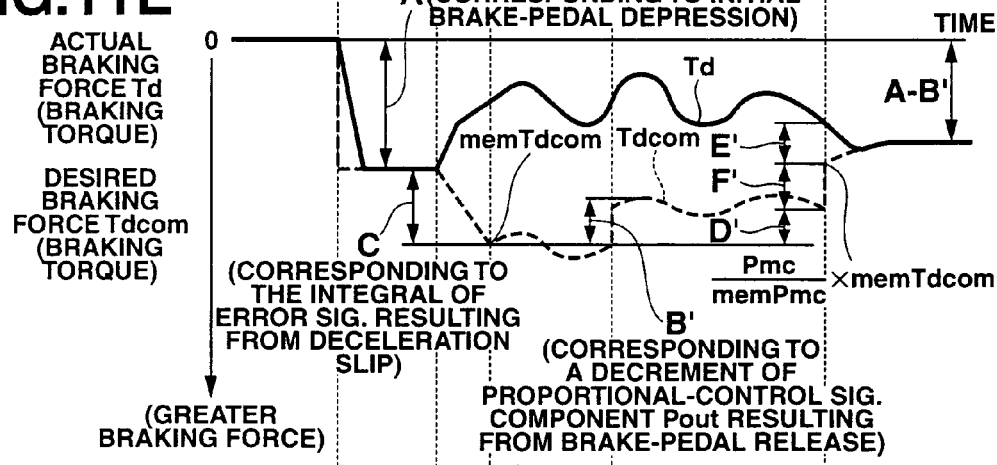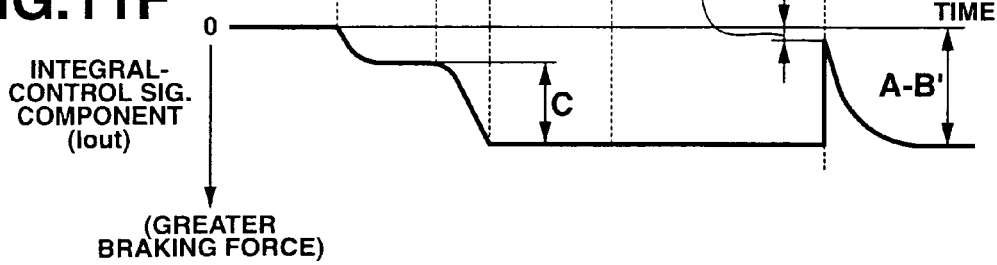

FIG.12A
MASTER-
CYLINDER
PRESSURE
(Pmc)

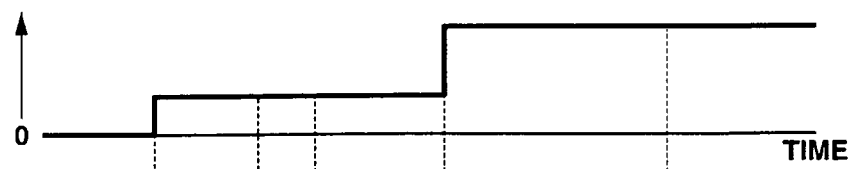

FIG.12B
ANTI-SKID
BRAKING
SYSTEM (ABS)

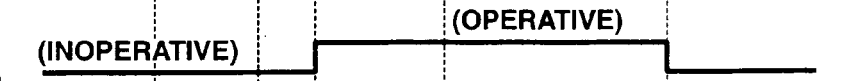

FIG.12C
ROAD-
SURFACE
FRICTION
FACTOR μ

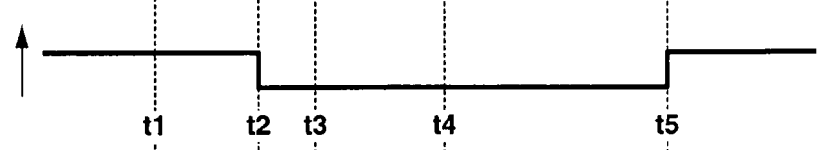

FIG.12D
ACTUAL
DECELERATION
(αv)

DESIRED
DECELERATION
(αdem)

(GREATER
DECELERATION)

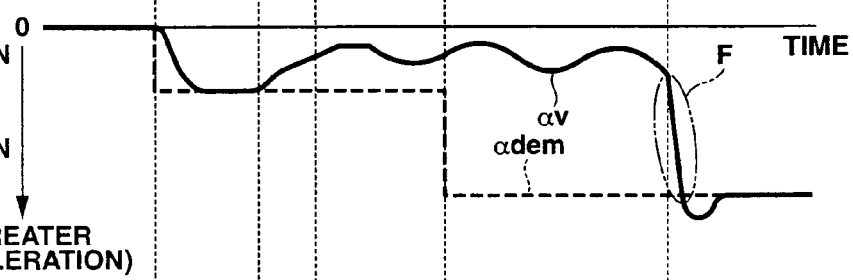

FIG.12E
ACTUAL
BRAKING
FORCE Td
(BRAKING
TORQUE)

DESIRED
BRAKING
FORCE Tdcom
(BRAKING
TORQUE)

(GREATER
BRAKING FORCE)

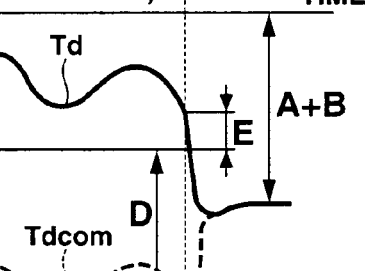

A (CORRESPONDING TO INITIAL BRAKE-PEDAL DEPRESSION)

C (CORRESPONDING TO THE INTEGRAL OF ERROR SIG. RESULTING FROM DECELERATION SLIP)

B (CORRESPONDING TO AN INCREMENT OF PROPORTIONAL-CONTROL SIG. COMPONENT Pout RESULTING FROM FURTHER BRAKE-PEDAL DEPRESSION)

FIG.12F
INTEGRAL-
CONTROL SIG.
COMPONENT
(Iout)

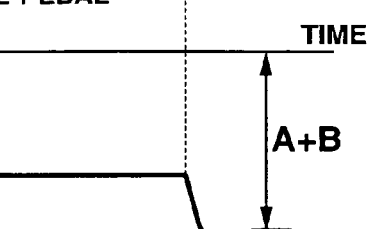

(GREATER
BRAKING FORCE)

AUTOMATIC BRAKING FORCE CONTROL APPARATUS

TECHNICAL FIELD

The present invention relates to an automatic braking force control apparatus with an automatic deceleration feedback control system for automotive vehicles, and specifically to the improvement of an automatic deceleration feedback control technology for a vehicle employing an anti-skid braking system.

BACKGROUND ART

In recent years, there have been proposed and developed various automatic deceleration feedback control systems, each feedback-controlling a braking force resulting from braking torque applied to each road wheel of an automotive vehicle responsively to a deviation between an actual deceleration of the vehicle and a desired deceleration, so that the actual deceleration is brought closer to the desired deceleration. The desired deceleration is usually determined based on the driver's braking action, i.e., the amount of brake-pedal depression. For instance, when an integral controller is used for vehicle-deceleration feedback control, the braking force of the road wheel is controlled in response to a control signal (an output signal) proportional to the integral of an error signal corresponding to the deceleration deviation, so that the actual deceleration is brought closer to the desired deceleration. The integral controller can reliably bring the actual deceleration closer to the desired deceleration, even in presence of disturbances (unwanted input signals) such as a change in movable load on the vehicle, thus exhibiting the superior disturbance stability or increased disturbance tolerance or superior disturbance reduction performance. Such a deceleration feedback control system equipped vehicle often employs an anti-skid braking system (ABS). As is generally known, the ABS system is able to repeatedly execute an anti-skid cycle constructed by a pressure-reduction mode, a pressure build-up mode, a pressure-hold mode, and the like, so as to reduce and recover the braking force applied to the road wheel, thus preventing a wheel lock-up condition, which may occur during driving of the vehicle on a so-called low-$\mu$ road. In the automotive vehicle capable of executing the skid control as well as the automatic deceleration feedback control, a priority is generally put on the skid control rather than the deceleration feedback control, during an emergency with wheel lock-up. During executions of the anti-skid cycle, the vehicle-deceleration feedback control is inhibited or interrupted, and thus there is an increased tendency for the actual braking force to be undesirably deviated from the desired braking force. In other words, the deceleration deviation tends to become greater. In case that the integral controller is used as a deceleration feedback controller, during repetitive executions of the anti-skid cycle, the integral of the error signal, resulting from the deviation, is continuously accumulated in the integrator every anti-skid cycles. Thus, the integral-control signal component (the output signal from the integral controller) becomes gradually high. When the deceleration feedback control restarts upon termination of skid control, there is an increased tendency for the undesirably high integral-control signal component to be output from the integral controller at a stretch. This results in a rapid change in braking force applied to each road wheel, thereby causing the driver to feel considerable discomfort. To avoid this, Japanese Patent Second Publication No. 56-033254 corresponding to U.S. Pat. No. 3,829,167 teaches and proposes to hold an integral-control signal component at the integral of an error signal (a deceleration deviation) computed at the first anti-skid cycle (just before initiation of skid control). Holding the integral-control signal component at the integral of the error signal computed at the first anti-skid cycle effectively suppresses an undesirable increase in the integral-control signal component (the output signal value generated from the integral controller), during skid control in which vehicle-deceleration feedback control is interrupted. According to the automatic deceleration control system disclosed in U.S. Pat. No. 3,829,167, it is possible to avoid a rapid change in braking force, which may take place when the deceleration feedback control resumes or restarts upon termination of skid control, thus eliminating any unnatural feeling that the magnitude of the actual braking force applied to the road wheel considerably differs from the amount of the driver's brake-pedal depression at the restarting point of the deceleration feedback control.

SUMMARY OF THE INVENTION

Actually, in order to enhance the deceleration feedback control responsiveness, the deceleration feedback control system requires a proportional control action combined with the previously-discussed integral control action. Assuming that the integral controller as disclosed in U.S. Pat. No. 3,829,167 is replaced with a proportional-plus-integral controller (PI controller) in which the output signal is a linear combination of the error signal (the deceleration deviation) and its integral, the following drawbacks occur.

Referring now to FIGS. 12A-12F, there are shown time charts of simulation results for a braking force control action obtained by a deceleration feedback control system equipped vehicle using a PI controller as an automatic vehicle-deceleration feedback controller, under a specified condition. The specified condition is a condition where a rise in a master-cylinder pressure Pmc occurs owing to the driver's brake-pedal depression at the time t1, a friction factor $\mu$ of a road surface changes from high to low at the time t2, the ABS system comes into operation at the time t3, a further rise in master-cylinder pressure Pmc occurs owing to a further increase in the driver's brake-pedal depression at the time t4, the anti-skid cycle terminates owing to a transition from the low-$\mu$ road-surface state to the high-$\mu$ road-surface state at the time t5, and the automatic deceleration feedback control restarts from the time t5.

As shown in FIGS. 12A and 12D, a desired deceleration $\alpha$dem becomes identical to an equivalent deceleration value determined based on a rise in master-cylinder pressure Pmc at the time t1 when master-cylinder pressure Pmc rises in a substantially stepwise manner. Desired deceleration $\alpha$dem further increases in a substantially stepwise manner by an equivalent deceleration value determined based on the further rise in master-cylinder pressure Pmc at the time t4 when the further brake-pedal depression occurs.

During a time period t1-t2 from the time t1 when the rise in master-cylinder pressure Pmc occurs to the time t2 when friction factor $\mu$ of the road surface changes from high to low and thus a skid starts to develop, a desired braking force Tdcom is determined as a value A (see FIG. 12E), corresponding to an initial brake-pedal depression. In case of the use of the PI controller, desired braking force Tdcom is calculated as a sum (Pout+Iout) of a proportional-control signal component Pout proportional to an error signal corresponding to a deviation $|\alpha v - \alpha dem|$ between an actual deceleration $\alpha v$ and desired deceleration $\alpha$dem and an integral-control signal component Iout corresponding to the integral of the error signal indicating deviation |αv−αdem|. From the time t1, an actual braking force Td is converged or brought closer to desired braking force Tdcom (see FIG. 12E). During the time period t1-t2, the road-surface friction factor μ is still high, and thus actual deceleration αv tends to follow desired deceleration αdem very well (see FIG. 12D). This means a small error signal value, that is, a small deceleration deviation |αv−αdem|, in other words, a small proportional-control signal component Pout and a small integral-control signal component Iout. That is, desired braking force Tdcom, corresponding to the sum (Pout+Iout) of proportional-control signal component Pout and integral-control signal component Iout, is varying responsively to a change in desired deceleration αdem (see FIGS. 12D-12E).

During a time period t2-t3 from the time t2 when the road-surface friction factor μ changes from high to low and thus a skid starts to develop to the time t3 when the ABS system comes into operation to prevent the wheel lock-up condition, the deviation |αv−αdem| tends to gradually increase owing to the increased wheel lock-up tendency (see the gradually increased difference between actual deceleration αv indicated by the solid line in FIG. 12D and desired deceleration αdem indicated by the broken line in FIG. 12D). As a result of the gradual increase in deviation |αv−αdem|, the integral of the error signal indicative of deviation |αv−αdem| tends to increase and thus the integral-control signal component Iout corresponding to the integral of the error signal indicative of deviation |αv−αdem| also increases up to a value C (see FIG. 12E). The integral-control signal component Iout increased up to the value C is accumulated in the integrator (see FIG. 12F). During the time period t2-t3, although desired deceleration αdem remains unchanged (see the broken line in FIG. 12D), desired braking force Tdcom tends to become greater owing to the integral-control signal component Iout accumulated in the integrator, as indicated by the value C in FIG. 12E.

During a time period t3-t4 from the time t3 when the ABS system comes into operation to the time t4 when the further rise in master-cylinder pressure Pmc occurs, the wheel lock-up tendency is suppressed by way of repetitive executions of the anti-skid cycle and thus an increase in deviation |αv−αdem| of actual deceleration αv from desired deceleration αdem is effectively suppressed (see the time period t3-t4 in FIG. 12D). During skid control, on the other hand, the integral-control signal component Iout is held at the integral of the error signal (corresponding to the deviation |αv−αdem|) computed at the first anti-skid cycle (just before skid-control starting point t3). Thus, desired braking force Tdcom can be kept almost constant (see slight variations in desired braking force Tdcom during the time period t3-t4 in FIG. 12E).

At the time point t4 of the further brake-pedal depression, deviation |αv−αdem| tends to rapidly increase responsively to a further increase in desired deceleration αdem, resulting from the further master-cylinder pressure rise (further brake-pedal depression). Note that, due to the rapidly increased deviation |αv−αdem| resulting from the further brake-pedal depression, the proportional-control signal component Pout also tends to increase rapidly at the time t4. As a result, desired braking force Tdcom is rapidly increased by an increment B at the time t4 (see the rapid change in desired braking force Tdcom indicated by the broken line in FIG. 12E). The increment B corresponds to an increment of proportional-control signal component Pout resulting from the further brake-pedal depression.

For the reasons discussed above, at the time point t5 of termination of skid control, desired braking force Tdcom, corresponding to the sum (Pout+Iout) of proportional-control signal component Pout and integral-control signal component Iout, tends to remarkably increase by an increment D (corresponding to an increment of proportional-control signal component Pout) in comparison with the magnitude of desired braking force Tdcom calculated at skid-control starting point t3. As a result, at skid-control termination point t5, the braking-force deviation |Td−Tdcom| between actual braking force Td and desired braking force Tdcom becomes a great value (D+E) (see FIG. 12E), in presence of an increase in desired deceleration αdem during skid control.

During skid control (during the time period t3-t5), a priority is put on the skid control rather than the vehicle-deceleration feedback control and thus the deceleration feedback-control function is disengaged. Therefore, during skid control, deviation |αv−αdem| of actual deceleration αv from desired deceleration αdem tends to increase.

As set forth above in reference to the time charts of FIGS. 12A-12F, assuming that a remarkable change in desired deceleration αdem occurs during skid control (during the time period t3-t5) owing to a further brake-pedal depression or a brake-pedal release, there is an increased tendency for a great deceleration deviation |αv−αdem|, in other words, a great braking-force deviation |Td−Tdcom| to take place at skid-control termination point (deceleration feedback control restarting point) t5, even in case that a PI controller is used for deceleration feedback control and additionally an integral-control signal component Iout is held at the integral of an error signal computed at the first anti-skid cycle. As can be seen from the rapid change in actual deceleration αv encircled by the phantom line F in FIG. 12D, in order to minimize the great deceleration deviation |αv−αdem|, actual deceleration αv must be rapidly increased and brought closer to desired deceleration αdem at a stretch, and at the same time in order to minimize the great braking-force deviation |Td−Tdcom|=(D+E), actual braking force Td must be rapidly increased and brought closer to desired braking force Tdcom at a stretch. This results in a rapid change in braking force applied to each road wheel, thereby causing the driver to feel considerable discomfort.

Accordingly, it is an object of the invention to provide an automatic braking force control apparatus for an automotive vehicle employing an automatic vehicle-deceleration feedback control system and an anti-skid braking system, capable of optimizing a control action of a restarting period of deceleration feedback control even in presence of a change in a desired deceleration during skid control, while preventing a change in a proportional-control signal component occurring owing to the desired deceleration change from being directly reflected in an output signal substantially corresponding to an initial value of a desired braking force to be generated when resuming the deceleration feedback control from a point of time of termination of skid control.

In order to accomplish the aforementioned and other objects of the present invention, an automatic braking force control apparatus for an automotive vehicle comprises a deceleration detector that detects an actual deceleration of the vehicle, a braking force adjustment device that adjusts an actual braking force of each of road wheels to a desired braking force, and a brake control unit configured to be electronically connected to the deceleration detector and the braking force adjustment device, for executing deceleration feedback control and anti-skid control being mutually exclusive, the brake control unit comprising a desired deceleration calculation section that calculates a desired deceleration based on a driver's braking action, a desired braking force calculation section that calculates the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation, an anti-skid control section that executes, irrespective of the desired braking force for the deceleration feedback control, an anti-skid cycle including at least a braking-force decrease mode and a braking-force increase mode, for preventing a wheel lock-up condition of the road wheel, a desired braking force memorizing section that memorizes the desired braking force, calculated just before a start time of the anti-skid cycle, as a desired braking force memorized value, and a desired braking force initialization section that initializes the desired braking force needed when restarting the deceleration feedback control from a termination time of the anti-skid cycle to a predetermined value calculated based on the desired braking force memorized value.

According to another aspect of the invention, an automatic braking force control apparatus for an automotive vehicle comprises a deceleration detector that detects an actual deceleration of the vehicle, a braking force adjustment device that adjusts an actual braking force of each of road wheels to a desired braking force, and a brake control unit configured to be electronically connected to the deceleration detector and the braking force adjustment device, for executing deceleration feedback control and anti-skid control being mutually exclusive, the brake control unit comprising a desired deceleration calculation section that calculates a desired deceleration based on a driver's braking action, a desired braking force calculation section that calculates the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation, an anti-skid control section that executes, irrespective of the desired braking force for the deceleration feedback control, an anti-skid cycle including at least a braking-force decrease mode at which the actual braking force of the road wheel reduces when a wheel lock-up condition of the road wheel, whose braking force is adjusted by the braking force adjustment device, occurs, and a braking-force increase mode at which the actual braking force increases when the wheel lock-up condition has been avoided by reducing the actual braking force applied to the road wheel, a desired braking force memorizing section that memorizes the desired braking force, calculated just before a start time of the anti-skid cycle, as a desired braking force memorized value, and a desired braking force initialization section that initializes the desired braking force needed when restarting the deceleration feedback control from a termination time of the anti-skid cycle to a predetermined value calculated based on the desired braking force memorized value, for preventing a change in the proportional-control signal component occurring owing to a change in the desired deceleration from being reflected in an output signal substantially corresponding to the desired braking force to be generated to the braking force adjustment device when restarting the deceleration feedback control from the anti-skid cycle termination time, even in presence of the change in the desired deceleration during the anti-skid cycle.

According to a further aspect of the invention, an automatic braking force control apparatus for an automotive vehicle comprises a deceleration detector that detects an actual deceleration of the vehicle, a wheel-speed sensor that detects a wheel speed of each of road wheels, a pressure sensor that detects a manipulated variable of a brake pedal, a braking force adjustment device that adjusts an actual braking force of each of the road wheels to a desired braking force, and a brake control unit configured to be electronically connected to the deceleration detector, the wheel-speed sensor, the pressure sensor and the braking force adjustment device, for executing deceleration feedback control and anti-skid control being mutually exclusive, the brake control unit comprising an anti-skid control system having a data processing section programmed to perform functions, namely, detecting a wheel lock-up condition of the road wheel based on the wheel speeds detected, and executing, irrespective of the desired braking force for the deceleration feedback control, an anti-skid cycle including at least a braking-force decrease mode and a braking-force increase mode, for preventing the wheel lock-up condition of the road wheel, and a deceleration feedback control system having a data processing section programmed to perform functions, namely calculating a desired deceleration based on the brake-pedal manipulated variable, calculating the desired braking force for the deceleration feedback control, as a summed value of a proportional-control signal component proportional to an error signal corresponding to a deviation between the desired deceleration and the actual deceleration, and an integral-control signal component corresponding to an integral of the error signal indicative of the deviation, memorizing the desired braking force, calculated just before a start time of the anti-skid cycle, as a desired braking force memorized value, and initializing the desired braking force needed when restarting the deceleration feedback control from a termination time of the anti-skid cycle to a predetermined value substantially corresponding to the desired braking force memorized value in presence of an increase in the desired deceleration during the anti-skid cycle.

According to a still further aspect of the invention, an automatic braking force control apparatus for an automotive vehicle comprises deceleration detection means for detecting an actual deceleration of the vehicle, braking force adjustment means for adjusting an actual braking force of each of road wheels to a desired braking force, and a brake control unit configured to be electronically connected to the deceleration detection means and the braking force adjustment means, for executing deceleration feedback control and anti-skid control being mutually exclusive, the brake control unit comprising desired deceleration calculation means for calculating a desired deceleration based on a driver's braking action, desired braking force calculation means for calculating the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation, anti-skid control means for executing, irrespective of the desired braking force for the deceleration feedback control, an anti-skid cycle including at least a braking-force decrease mode and a braking-force increase mode, for preventing a wheel lock-up condition of the road wheel, desired braking force memorizing means for memorizing the desired braking force, calculated just before a start time of the anti-skid cycle, as a desired braking force memorized value, and desired braking force initialization means for initializing the desired braking force needed when restarting the deceleration feedback control from a termination time of the anti-skid cycle to a predetermined value calculated based on the desired braking force memorized value.

The other objects and features of this invention will become understood from the following description with reference to the accompanying drawings.

BRIEF DESCRIPTION OF THE DRAWINGS

FIGS. 5A-5F are time charts showing simulation results for a braking force control action obtained by using the deceleration controller incorporated in the brake control unit shown in FIG. 2.

FIGS. 7A-7F are time charts showing simulation results for a braking force control action obtained by using the first modified desired braking force arithmetic-and-logic processing shown in FIG. 6.

FIGS. 9A-9G are time charts showing simulation results for a braking force control action obtained by using the second modified desired braking force arithmetic-and-logic processing shown in FIG. 8.

FIGS. 11A-11F are time charts showing simulation results for a braking force control action obtained by using the third modified desired braking force arithmetic-and-logic processing shown in FIG. 10.

FIGS. 12A-12F are time charts showing simulation results for a braking force control action obtained by a deceleration feedback control system equipped vehicle using a PI controller as an automatic vehicle-deceleration feedback controller.

DESCRIPTION OF THE PREFERRED EMBODIMENTS

Figure 1:
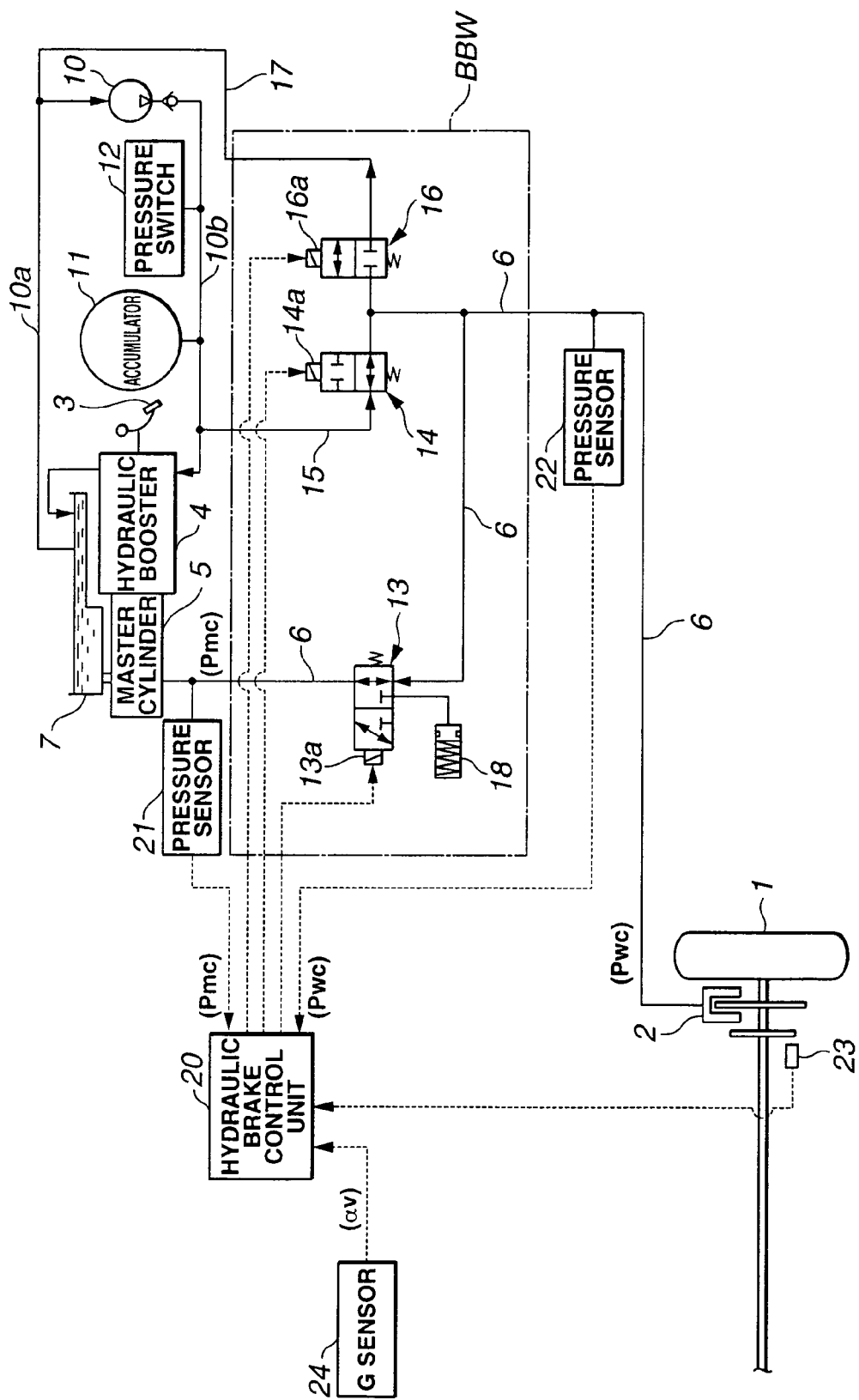
FIG. 1 is a system block diagram illustrating an embodiment of an automatic braking force control apparatus with hydraulic braking system interaction.

Referring now to the drawings, particularly to FIG. 1, the automatic braking force control apparatus of the embodiment is exemplified in a four-wheel-brake cylinder equipped automotive vehicle with a brake-by-wire (BBW) hydraulic brake system. In the system block diagram of FIG. 1, for the sake of simplicity, a wheel-brake cylinder 2 for only one road wheel 1 is shown. An electronically-controlled brake-by-wire actuator BBW is provided for regulating or adjusting the brake-fluid pressure of wheel-brake cylinder 2. In FIG. 1, a component part denoted by reference sign 3 is a brake pedal, which is depressed by the driver, depending on the driver's wishes or the magnitude of the driver-required braking force. The brake-pedal pressure of brake pedal 3 is multiplied or magnified by means of a hydraulic booster 4. When a piston cup (not shown) slidably housed in a master cylinder 5 is pushed by the multiplied brake-pedal pressure, hydraulic pressure Pmc in master cylinder 5 develops, forcing brake fluid through brake lines 6 to the wheel-brake cylinders. Master cylinder 5 generates master-cylinder pressure Pmc, which is determined based on the brake-pedal pressure. Brake fluid stored in a common reservoir 7 is used as the working medium for both of hydraulic booster 4 and master cylinder 5. Hydraulic booster 4 is connected to a discharge port of a hydraulic pump 10 whose inlet port is connected to reservoir 7. During operation of pump 10, brake fluid in reservoir 7 is drawn through an induction circuit 10a into the inlet port of pump 10, and then forced out through the discharge port of pump 10 and a discharge circuit 10b toward hydraulic booster 4. A hydraulic accumulator 11 is disposed in a middle of the discharge circuit interconnecting hydraulic booster 4 and pump 10, to store the pressurized brake fluid. The internal pressure in accumulator 11 is controlled or regulated by a pressure switch 12 disposed in discharge circuit 10b between the discharge port of pump 10 and accumulator 11, by way of sequential control. Hydraulic booster 4 operates to multiply the brake-pedal pressure produced by depressing brake pedal 3 by the driver's foot, while using the hydraulic pressure in accumulator 11 as a hydraulic pressure source. The multiplied brake-pedal pressure pushes the master-cylinder piston, and thus master-cylinder pressure Pmc develops depending on the brake-pedal pressure. The hydraulic pressure charged in brake line 6 is supplied to wheel-brake cylinder 2 as a wheel-brake cylinder pressure Pwc. As described later, wheel-brake cylinder pressure Pwc is feedback-controlled, utilizing the internal pressure of accumulator 11. For the feedback control of wheel-brake cylinder pressure Pwc, an electromagnetic directional control valve 13 is disposed in a middle of brake line 6. A pressure build-up circuit 15 is connected at one end to discharge circuit 10b between hydraulic booster 4 and accumulator 11 and connected at the other end to brake line 6 between wheel-brake cylinder 2 and directional control valve 13. A pressure build-up valve 14 is disposed in a middle of pressure build-up circuit 15. A pressure-reduction circuit 16 is connected at one end to induction circuit 10a between reservoir 7 and the inlet port of pump 10 and connected at the other end to brake line 6 between wheel-brake cylinder 2 and directional control valve 13. Electromagnetic directional control valve 13, pressure build-up valve 14, and pressure-reduction valve 16 construct brake-by-wire actuator BBW, which serves as a braking force adjustment device (or braking force adjustment means). As shown in FIG. 1, in the system of the shown embodiment, directional control valve 13 is comprised of a normally-open, single solenoid-actuated two-position spring-offset directional control valve having an electromagnetic solenoid 13a. With solenoid 13a de-energized (OFF), directional control valve 13 is kept in its valve-open position and thus fluid communication between the outlet port of master cylinder 5 and the inlet-and-outlet port of wheel-brake cylinder 2 is established. With directional control valve 13 opened, master-cylinder pressure Pmc is directed via directional control valve 13 to wheel-brake cylinder 2 so that the pressure value of wheel-brake cylinder pressure Pwc varies depending on changes in master-cylinder pressure Pmc. Conversely when solenoid 13a is energized (ON), brake line 6 is shut off and thus fluid communication between the outlet port of master cylinder 5 and the inlet-and-outlet port of wheel-brake cylinder 2 is blocked, and simultaneously the outlet port of master cylinder 5 is connected via directional control valve 13 to a stroke simulator 18. Almost the same hydraulic pressure as hydraulic pressure application from master cylinder 5 via directional control valve 13 to wheel-brake cylinder 2 under the normally-opened state of directional control valve 13, can be applied from master cylinder 5 via directional control valve 13 to stroke simulator 18 even under the shut-off state of brake line 6. Stroke simulator 18 continuously gives the driver a natural feeling of the braking action, even when brake line 6 is shut off with solenoid 13a energized.

Pressure build-up valve 14 is comprised of a normally-open, single solenoid-actuated two-position spring-offset directional control valve having an electromagnetic solenoid 14a. With solenoid 14a de-energized (OFF), pressure build-up valve 14 is kept in its open position and thus fluid flow through pressure build-up circuit 15 is permitted. Under the normally-opened state of pressure build-up valve 14, the hydraulic pressure stored in accumulator 11 is directed via pressure build-up valve 14 to wheel-brake cylinder 2, to build up the pressure level of wheel-brake cylinder pressure Pwc. Conversely when solenoid 14a is energized (ON), a rate of pressure build-up of wheel-brake cylinder pressure Pwc is decreased by reducing the opening of pressure build-up valve 14 in proportion to a current value of exciting current applied to solenoid 14a. On the other hand, pressure-reduction valve 16 is comprised of a normally-closed, single solenoid-actuated two-position spring-offset directional control valve having an electromagnetic solenoid 16a. With solenoid 16a de-energized (OFF), pressure-reduction valve 16 is kept in its closed position and thus fluid flow through pressure-reduction circuit 17 is blocked. Conversely when solenoid 16a is energized (ON), a rate of pressure reduction of wheel-brake cylinder pressure Pwc is increased by increasing the opening of pressure-reduction valve 16 in proportion to a current value of exciting current applied to solenoid 16a.

During a period of time during which directional control valve 13 is held in the opened position to permit fluid flow from master cylinder 5 through brake line 6 to wheel-brake cylinder 2, the BBW hydraulic brake system (13, 14, 16) permits wheel-brake cylinder pressure Pwc to be determined based on master-cylinder pressure Pmc by blocking pressure build-up circuit 15 with pressure build-up valve 14 closed (or with solenoid 14a energized) and by blocking pressure-reduction circuit 17 with pressure-reduction valve 16 closed (or with solenoid 16a de-energized). During a period of time during which the pressure build-up action for wheel-brake cylinder pressure Pwc is performed by pressure build-up valve 14 or the pressure-reduction action for wheel-brake cylinder pressure Pwc is performed by pressure-reduction valve 16, the BBW hydraulic brake system (13, 14, 16) permits wheel-brake cylinder pressure Pwc to be increased or decreased without being affected by changes in master-cylinder pressure Pmc by shutting off the brake line 6 with solenoid 13a of directional control valve 13 energized (ON).

Directional control valve 13, pressure build-up valve 14, and pressure-reduction valve 16 are controlled in response to respective control signals from a hydraulic brake control unit 20. Brake control unit 20 generally comprises a microcomputer. Brake control unit 20 includes an input/output interface (I/O), memories (RAM, ROM), and a microprocessor or a central processing unit (CPU). The input/output interface (I/O) of brake control unit 20 receives input information from various engine/vehicle sensors, namely pressure sensors 21 and 22, a wheel-speed sensor 23, and an acceleration sensor (longitudinal G sensor) 24. Pressure sensor 21 is provided to detect master-cylinder pressure Pmc (or a manipulated variable of the driver's brake-pedal depression). Pressure sensor 22 is provided to detect wheel-brake cylinder pressure Pwc corresponding to the actual braking force resulting from braking torque application. Wheel-speed sensor 23 is provided to detect a peripheral speed Vw of road wheel 1, called "wheel speed". G sensor 24 is provided to detect an actual deceleration αv of the vehicle. G sensor 24 serves as a deceleration detector (or deceleration detection means). Within brake control unit 20, the central processing unit (CPU) allows the access by the I/O interface of input informational data signals from the previously-discussed engine/vehicle sensors 21, 22, 23, and 24. The CPU of brake control unit 20 is responsible for carrying the predetermined braking force control program stored in memories and is capable of performing necessary arithmetic and logic operations containing the hydraulic brake control management processing shown in the functional block diagram of FIG. 2 and illustrated by the flow chart of each deceleration feedback control routine shown in FIGS. 4, 6, 8, and 10. In addition to the arithmetic and logic operations for automatic deceleration feedback control, the CPU of brake control unit 20 is capable of performing arithmetic and logic operations for anti-skid control that is initiated when a wheel lock-up condition occurs. Computational results (arithmetic calculation results) for deceleration feedback control and/or anti-skid control, that is, calculated output signals are relayed through the output interface circuitry of the hydraulic brake control unit via a wheel-brake cylinder pressure servo calculation section 36 (see FIG. 2) to output stages, namely solenoid 13a of directional control valve 13, solenoid 14a of pressure build-up valve 14, and solenoid 16a of pressure-reduction valve 16, all included in the brake-by-wire actuator BBW.

Figure 2:
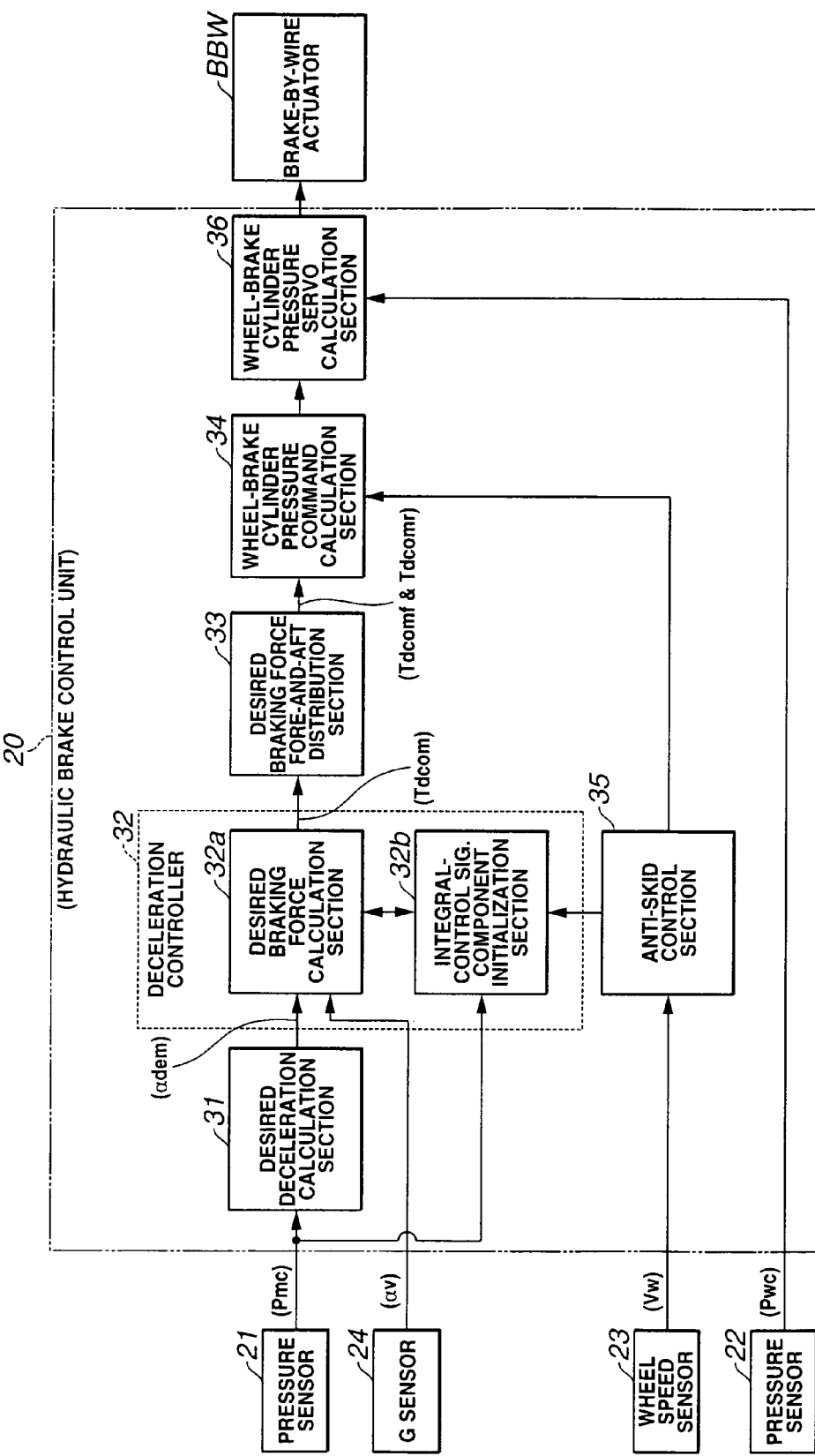
FIG. 2 is a block diagram illustrating details of a hydraulic brake control unit incorporated in the automatic braking force control apparatus shown in FIG. 1.

Referring now to FIG. 2, there is shown the functional block diagram of the hydraulic brake control unit of the braking force control apparatus of the embodiment. In FIG. 2, a desired deceleration calculation section 31 serves as a desired deceleration calculation section (or desired deceleration calculation means). Desired deceleration calculation section 31 arithmetically calculates a desired deceleration αdem based on master-cylinder pressure Pmc detected by pressure sensor 21 and a predetermined constant K1, such as 1.18801E-06, determined by vehicle specifications, from the following expression.

$$\alpha dem = -(Pmc \times K1)$$

As can be appreciated from the minus sign of the aforementioned expression, a deceleration is indicated as a negative value of acceleration α, and a braking torque is indicated as a negative value of torque T.

A deceleration controller 32 shown in FIG. 2 is provided for arithmetically calculating a desired braking force Tdcom based on desired deceleration αdem and an actual deceleration αv detected by G sensor 24. Deceleration controller 32 is comprised of a desired braking force calculation section 32a and an integral-control signal component initialization section 32b.

Desired braking force calculation section 32a functions to calculate a deceleration deviation Δα (=αdem−αv) by subtracting actual deceleration αv from desired deceleration αdem. Desired braking force calculation section 32a also includes a feedback compensator having a predetermined feedback-compensation characteristic $C_{FB}(s)=(Kp \cdot s+Ki)/s$, so as to compute or derive a braking-force feedback-compensation value Tdfb by passing the deceleration deviation Δα (=αdem−αv) through the feedback compensator of the predetermined feedback-compensation characteristic $C_{FB}(s)=(Kp \cdot S+Ki)/s$. The computed braking-force feedback-compensation value Tdfb is substituted for a desired braking force Tdcom. In the shown embodiment, the predetermined feedback-compensation characteristic $C_{FB}(s)=(Kp \cdot s+Ki)/s$ is achieved by means of a proportional-plus-integral controller (PI controller) in which the output signal is a linear combination of the error signal (deceleration deviation Δα) and its integral. Regarding the above feedback-compensation characteristic $C_{FB}(s)=(Kp \cdot s+Ki)/s$, an adjustable gain Kp, such as 265.66518, for the proportional term and an adjustable gain Ki, such as 2082.2406, for the integrating term are determined, taking into account both of the respective gain margins and phase margins. In more detail, desired braking force Tdcom is calculated as a summed value (Pout+Iout) of a proportional-control signal component Pout proportional to an error signal corresponding to the deceleration deviation $\Delta\alpha$ (=αdem−αv) and an integral-control signal component Iout corresponding to the integral of the error signal indicative of deviation $\Delta\alpha$ (=αdem−αv).

Integral-control signal component initialization section 32b functions to initialize integral-control signal component Iout computed within deceleration controller 32, at a timing when the deceleration feedback control, which has been interrupted during executions of anti-skid control, resumes or restarts as soon as the skid control terminates. Details of the initialization of integral-control signal component Iout will be described later. Desired braking force calculation section 32a of deceleration controller 32 resumes the deceleration feedback control based on an initial value Iout(02) (described later) of integral-control signal component Iout initialized by integral-control signal component initialization section 32b, when restarting the deceleration feedback control upon termination of the skid control. For skid control, an anti-skid control section (simply, skid control section) 35 (described later) is provided. As hereunder described in detail, the anti-skid control executed by the skid control system including skid control section 35 and the deceleration feedback control executed by the automatic deceleration control system including deceleration controller 32 are mutually exclusive. That is, during skid control, the automatic deceleration control system including deceleration controller 32 is interrupted or temporarily stopped.

Figure 3:
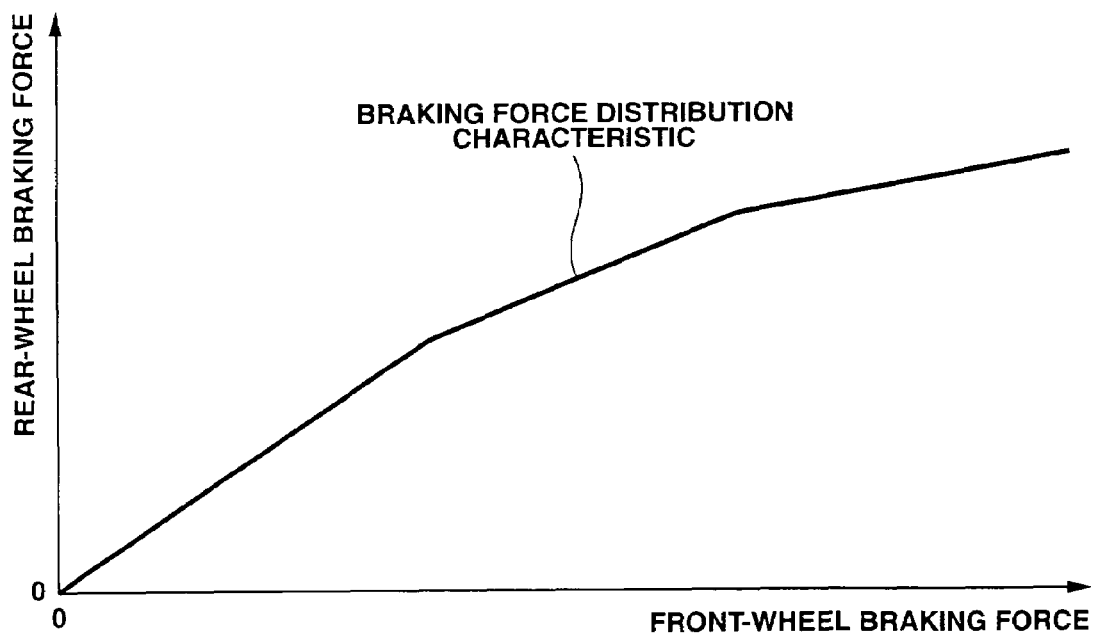
FIG. 3 is a predetermined fore-and-aft braking force distribution characteristic diagram showing an ideal braking force distribution between a front-wheel braking force and a rear-wheel braking force.

A desired braking force fore-and-aft distribution section 33 functions to distribute desired braking force Tdcom calculated through deceleration controller 32 into a front-wheel braking torque command Tdcomf and a rear-wheel braking torque command Tdcomr, utilizing the predetermined ideal fore-and-aft braking force distribution characteristic shown in FIG. 3 according to which front-wheel lock-up and rear-wheel lock-up occur simultaneously.

A wheel-brake cylinder pressure command calculation section 34 arithmetically calculates a front-right wheel-brake cylinder pressure command BRKcomfr, a front-left wheel-brake cylinder pressure command BRKcomfl, a rear-right wheel-brake cylinder pressure command BRKcomrr, and a rear-left wheel-brake cylinder pressure command BRKcomrl, based on front-wheel braking-torque command Tdcomf and rear-wheel braking-torque command Tdcomr, and predetermined constants Kf (e.g., 1721.211871) and Kr (e.g., 3676.200279) both determined by the vehicle specifications, from the following expressions. The first predetermined constant Kf is a conversion factor used to convert a front-wheel braking torque to a front wheel-brake cylinder pressure, whereas the second predetermined constant Kr is a conversion factor used to convert a rear-wheel braking torque to a rear wheel-brake cylinder pressure.

$BRKcomfr = -(Tdcomf \times Kf)$ $BRKcomfl = -(Tdcomf \times Kf)$ $BRKcomrr = -(Tdcomr \times Kr)$ $BRKcomrl = -(Tdcomr \times Kr)$ Anti-skid control section (simply, skid control section) 35 calculates a wheel acceleration dVw/dt by differentiating wheel speed Vw detected by wheel-speed sensor 23, and also estimates a vehicle speed V based on both of wheel speed Vw and wheel acceleration dVw/dt. Skid control section 35 estimates a deceleration slip rate (simply, slip rate) Slip of road wheel 1 based on information about wheel speed Vw, wheel acceleration dVw/dt, and the estimated vehicle speed V, and repeatedly executes, responsively to the slip rate, an anti-skid cycle constructed by at least a pressure-reduction mode (or a braking-force decrease mode), at which the braking force of road wheel 1 is reduced when a wheel lock-up condition (or a wheel lock-up tendency) of road wheel 1, whose braking force is adjusted by brake-by-wire actuator BBW, occurs, and a pressure build-up mode (or a braking-force increase mode), at which the braking force of road wheel 1 is increased after the wheel lock-up condition has been avoided by reducing the braking force applied to the road wheel. Actually, skid control section 35 calculates an anti-skid control braking force command Tabscom needed to suppress the wheel lock-up tendency. During skid control, skid control section 35 derives or calculates, based on anti-skid control braking force command Tabscom, a skid-control front-right wheel-brake cylinder pressure command ABScomfr, a skid-control front-left wheel-brake cylinder pressure command ABScomfl, a skid-control rear-right wheel-brake cylinder pressure command ABScomrr, and a skid-control rear-left wheel-brake cylinder pressure command ABScomrl. And then, skid control section 35 outputs signals indicative of the calculated skid-control wheel-brake cylinder pressure commands ABScomfr, ABScomfl, ABScomrr, and ABScomrl to wheel-brake cylinder pressure command calculation section 34.

When the ABS system (skid control section 35) is in an inoperative (OFF) state, wheel-brake cylinder pressure command calculation section 34 calculates or determines wheel-brake cylinder pressure commands BRKcomfr, BRKcomfl, BRKcomrr, and BRKcomrl, in such a manner as to realize front-wheel braking-torque command Tdcomf and rear-wheel braking-torque command Tdcomr (see the previously-discussed expressions BRKcomfr =−(Tdcomf×Kf), BRKcomfl =−(Tdcomf×Kf), BRKcomrr =−(Tdcomr×Kr), and BRKcomrl =−(Tdcomr×Kr)).

Conversely when the ABS system (skid control section 35) is in an operative (ON) state, skid-control wheel-brake cylinder pressure commands ABScomfr, ABScomfl, ABScomrr, and ABScomrl are generated from skid control section 35 to wheel-brake cylinder pressure command calculation section 34, wheel-brake cylinder pressure command calculation section 34 determines wheel-brake cylinder pressure commands BRKcomfr, BRKcomfl, BRKcomrr, and BRKcomrl, from the following expressions, regardless of front-wheel and rear-wheel braking-torque commands Tdcomf and Tdcomr.

$BRKcomfr=ABScomfr$ $BRKcomfl=ABScomfl$ $BRKcomrr=ABScomrr$ $BRKcomrl=ABScomrl$

On the other hand, wheel-brake cylinder pressure servo calculation section 36 outputs a pressure build-up valve-opening control signal for pressure build-up valve 14 and a pressure-reduction valve-opening control signal for pressure-reduction valve 16 to brake-by-wire actuator BBW, so that the front-right, front-left, rear-right, and rear-left wheel-brake cylinder pressures, detected by the respective wheel-brake cylinder pressure sensors, are brought closer to the respective desired values, that is, wheel-brake cylinder pressure commands BRKcomfr, BRKcomfl, BRKcomrr, and BRKcomrl.

The BBW hydraulic brake system can bring the wheel-brake cylinder pressures of the four road wheels closer to the respective wheel-brake cylinder pressure commands BRKcomfr, BRKcomfl, BRKcomrr, and BRKcomrl, by generating a control signal needed to shut off the brake line 6 by energizing solenoid 13a of directional control valve 13 included in brake-by-wire actuator BBW.

Figure 4:
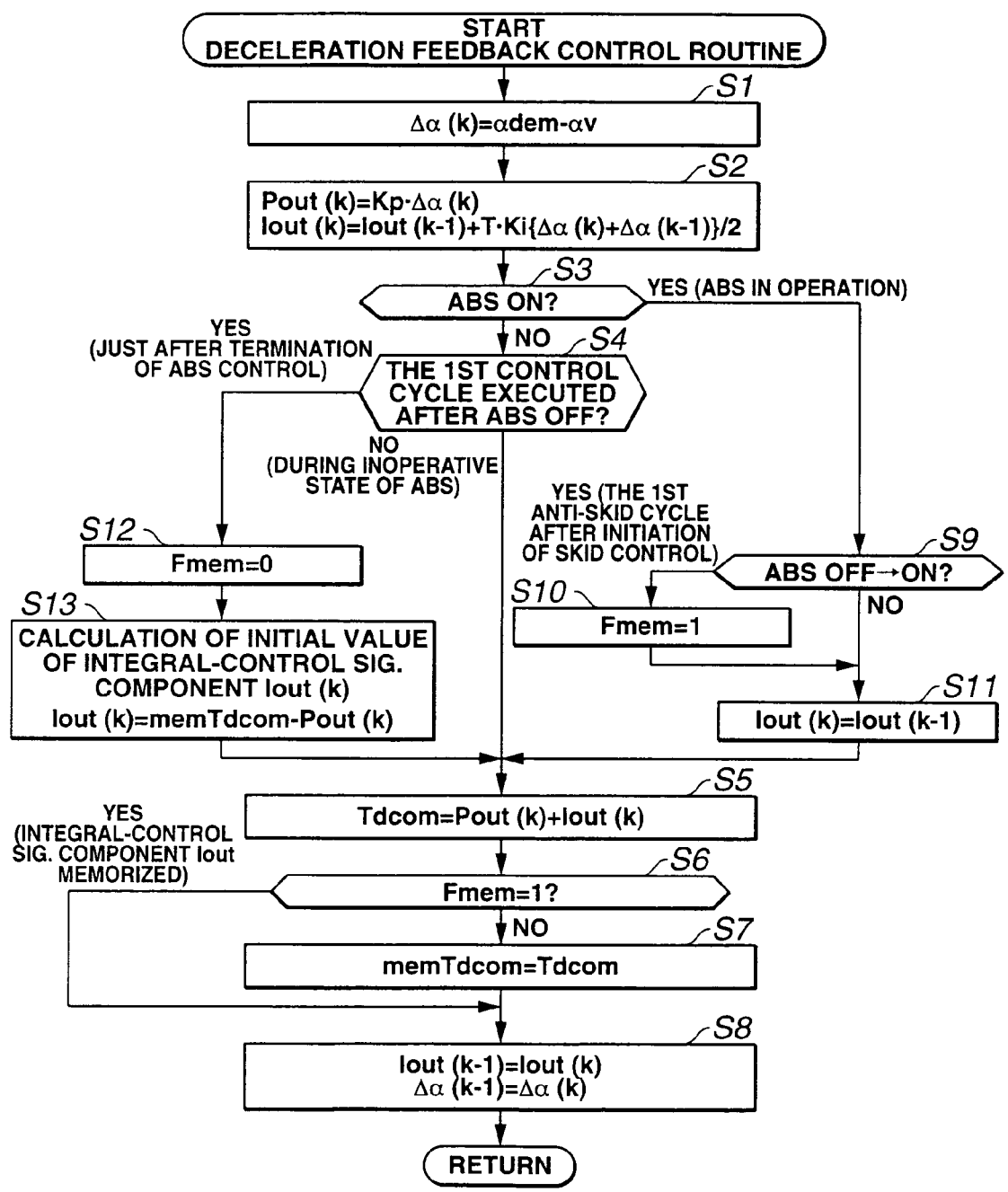
FIG. 4 is a flow chart illustrating the desired braking force arithmetic-and-logic processing executed within a deceleration controller incorporated in the brake control unit shown in FIG. 2.

Details of the arithmetic and logic operations (the deceleration feedback control routine) executed within deceleration controller 32 are hereunder described in reference to the flow chart shown in FIG. 4. The arithmetic and logic processing shown in FIG. 4 is executed as time-triggered interrupt routines to be triggered every predetermined sampling time intervals T such as 10 milliseconds. Desired braking force Tdcom is computed or determined by way of the deceleration feedback control for the braking force for each road wheel.

At step S1, deceleration deviation $\Delta\alpha$ is arithmetically calculated by subtracting actual deceleration $\alpha v$ from desired deceleration $\alpha$dem, as follows.

$$\Delta\alpha(k)=\alpha dem-\alpha v$$

In the above expression $\Delta\alpha(k)=\alpha dem-\alpha v$, the suffix (k) of deviation $\Delta\alpha(k)$ means a current value of deviation $\Delta\alpha$. On the other hand, the suffix (k−1) of deviation $\Delta\alpha(k-1)$ (described later) means a previous value of deviation $\Delta\alpha$, calculated one cycle before.

At step S2, by way of a so-called Tustin approximation, a continuous-system transfer function is replaced by a discrete-system transfer function, so as to derive a recurrence formula. The current value Pout(k) of proportional-control signal component Pout for desired braking force Tdcom and the current value Iout(k) of integral-control signal component Iout for desired braking force Tdcom are arithmetically calculated, based on the current deviation $\Delta\alpha(k)$ and the previous deviation $\Delta\alpha(k-1)$, from the following expressions.

$$Pout(k)=Kp\cdot\Delta\alpha(k)$$

$$Iout(k)=Iout(k-1)+T\cdot Ki\{\Delta\alpha(k)+\Delta\alpha(k-1)\}/2$$

where T denotes a predetermined sampling time interval such as 10 milliseconds.

At step S3, a check is made to determine whether the ABS system (skid control section 35) is in the operative (ON) state. When skid control is not executed and thus the answer to step S3 is in the negative (NO), the routine proceeds from step S3 to step S4. Conversely when skid control is executed and thus the answer to step S3 is in the affirmative (YES), the routine proceeds from step S3 to step S9.

At step S4, a check is made to determine whether the current execution cycle for deceleration feedback control corresponds to the first control cycle executed just after the ABS system (skid control section 35) has been switched from the operative (ON) state to the inoperative (OFF) state. When the ABS system (skid control section 35) remains inoperative (OFF) and thus the answer to step S4 is negative (NO), the routine flows from step S4 through step S5 to step S6. Conversely when the current execution cycle for deceleration feedback control corresponds to the first control cycle executed just after termination of skid control and thus the answer to step S4 is affirmative (YES), the routine flows from step S4 through steps S12-S13 to step S5.

At step S5, the summed value (Pout(k)+Iout(k)) of the current proportional-control signal component Pout(k) and the current integral-control signal component Iout(k), both calculated based on the deceleration deviation data ($\Delta\alpha(k)$, $\Delta\alpha(k-1)$) by the arithmetic calculation for deceleration feedback control (PI control), is determined as desired braking force Tdcom, that is, Tdcom=Pout(k)+Iout(k). The arithmetic processing of step S5 serves as a desired braking force calculation section (or desired braking force calculation means).

At step S6, a check is made to determine whether a memorized state indicative flag (simply, a memory flag) Fmem is set (=1). The state of memory flag Fmem indicated by the equality Fmem=1 means that a memorizing operation for integral-control signal component Iout, to be executed upon initiation of skid control, has already been made. When integral-control signal component Iout has already been memorized after the skid control has started and thus memory flag Fmem is set (=1), the routine jumps from step S6 to step S8. Conversely when the ABS system (skid control section 35) is kept in the inoperative (OFF) state and thus memory flag Fmem is reset (=0), the routine proceeds from step S6 to step S7.

At step S7, a desired braking force memorized value memTdcom is repeatedly updated by desired braking force Tdcom (=Pout(k)+Iout(k)), calculated through step S5, that is, memTdcom=Tdcom.

At step S8, for the next execution cycle, the current value Iout(k) of the integral-control signal component is substituted for a variable indicative of the previous value Iout(k−1) of the integral-control signal component, that is, Iout(k−1)=Iout(k). At the same time, at step S8, for the next execution cycle, the current value $\Delta\alpha(k)$ of the deceleration deviation is substituted for a variable indicative of the previous value $\Delta\alpha(k-1)$ of the deceleration deviation, that is, $\Delta\alpha(k-1)=\Delta\alpha(k)$.

Concretely, when the ABS system remains inoperative, the routine advances from step S3 through steps S4 to a series of steps S5-S8. When the ABS system is in operation and thus the anti-skid cycle is repeatedly executed, the routine advances from step S3 through steps S9-S11 to steps S5-S8. Just after the skid control has terminated, only once, the flow from step S4 through steps S12-S13 to steps S5-S8 takes place. The routine proceeds from step S3 via step S4 to steps S5-S8, until a new anti-skid cycle restarts after termination of skid control.

Returning to step S3, if the ABS system (skid control section 35) is in operation and thus the answer to step S3 is affirmative (YES), the routine advances from step S3 to step S9.

At step S9, a check is made to determine whether the current anti-skid cycle corresponds to the first anti-skid cycle executed after initiation of skid control. When the current anti-skid cycle corresponds to the first anti-skid cycle and thus the answer to step S9 is affirmative (YES), only once, the flow from step S9 via step S10 to step S11 occurs. Conversely when the current anti-skid cycle is a cycle of the second henceforth and thus the answer to step S9 is negative (NO), the routine proceeds from step S9 to step S11 without flowing to step S10. Step S11 is repeatedly executed during skid control.

At step S10, memory flag Fmem is set to "1".

At step S11, the current value Iout(k) of the integral-control signal component, calculated through step S2, is repeatedly updated to the previous value Iout(k−1), calculated through step S8, that is, Iout(k)=Iout(k−1), during repetitive executions of the anti-skid cycle, and whereby during skid control the integral-control signal component Iout is maintained at the initial value Iout(01) of integral-control signal component Iout, calculated just before initiation of skid control.

After step S11, steps S5-S8 occur. In determining or calculating desired braking force Tdcom at step S5 as the summed value (Pout(k)+Iout(k)) of the current proportional-control signal component Pout(k) and the current integral-control signal component Iout(k), the initial value Iout(01), calculated just before initiation of skid control is used as the current integral-control signal component Iout(k) during skid control. Just after the skid-control start time, memory flag Fmem is switched to the set state (Fmem=1) through step S10. Thus, during repeated executions of the anti-skid cycle, the routine flows from step S6 to step S8, while skipping step S7. Skipping step S7 under the condition of Fmem=1 means that desired braking force memorized value memTdcom is fixed to the desired braking force Tdcom calculated just before initiation of skid control. As a result, the desired braking force Tdcom, calculated just before initiation of skid control, is memorized as desired braking force memorized value memTdcom of skid-control start time t3. In the routine shown in FIG. 4, steps S6, S7, and S10 serve as an anti-skid cycle start time desired braking force memorizing section (or anti-skid cycle start time desired braking force memorizing means).

Immediately when the anti-skid cycle has terminated, that is, just after termination of skid control, only once, the routine advances from step S4 via step S12 to step S13.

At step S12, memory flag Fmem is reset to "0".

At step S13, the current integral-control signal component Iout(k) is arithmetically calculated or computed by subtracting the current proportional-control signal component Pout(k) calculated through step S2 from desired braking force memorized value memTdcom, that is, Iout(k)=memTdcom−Pout(k). Thereafter, the control routine flows from step S13 to steps S5-S8. Note that, in determining or calculating desired braking force Tdcom at step S5 just after termination of the anti-skid cycle (in case of the flow from step S4 through steps S12-S13 to step S5), the integral-control signal component Iout(k) (=memTdcom−Pout(k)) calculated through step S13 is used as the current value of the integral-control signal component Iout just after termination of the anti-skid cycle. The integral-control signal component Iout(k) (=memTdcom−Pout(k)) calculated through step S13 corresponds to an initial value (or an initialized value) Iout(02) of integral-control signal component Iout for vehicle-deceleration feedback control (PI control), used or needed when restarting the deceleration feedback control just after termination of the anti-skid cycle. In presence of the flow from step S4 through steps S12-S13 to step S5, at step S5 desired braking force Tdcom of the anti-skid cycle termination time is calculated as desired braking force memorized value memTdcom of the anti-skid cycle start time, from the following expression.

$$Tdcom=Pout(k)+Iout(k)=Pout(k)+Iout(02)=Pout(k)+\{memTdcom-Pout(k)\}=memTdcom$$

Therefore, step S13 serves as an anti-skid cycle termination time integral-control signal component initialization section (or anti-skid cycle termination time integral-control signal component initialization means) and an anti-skid cycle termination time desired braking force initialization section (or anti-skid cycle termination time desired braking force initialization means). At step S6 executed just after termination of skid control, the answer to step S6 becomes negative (NO), since memory flag Fmem has already been reset (=0) through step S12. Thus, the routine proceeds from step S6 to step S7. At step S7, the updating action of desired braking force memorized value memTdcom by the desired braking force Tdcom calculated through step S5 restarts.

From the next cycle executed after, only once, the flow from step S4 through steps S12-S13 has occurred just after termination of skid control, step S4 functions to direct the control routine therevia to steps S5-S8. As a result, the braking force control continuously executed in accordance with the usual deceleration feedback control. During the usual deceleration feedback control mode, integral-control signal component Iout(k) gradually recovers from the initial value (Iout(02)=memTdcom−Pout(k)) calculated through step S13 to a normal value. Therefore, desired braking force Tdcom determined or calculated through step S5 as the summed value (Pout(k)+Iout(k)) of the current proportional-control signal component Pout(k) and the current integral-control signal component Iout(k), also recovers gradually to a normal value determined based on the driver's braking action.

The details of the operation and effects of the automatic braking force control apparatus of the embodiment are hereunder described in reference to the time charts shown in FIGS. 5A-5F. FIGS. 5A-5F show simulation results for a braking force control action obtained by the deceleration feedback control system equipped vehicle using deceleration controller 32 executable the routine of FIG. 4, under the same specified condition as the simulations shown in FIGS. 12A-12F. During the time period t3-t5 from skid-control starting point t3 to skid-control termination point t5, that is, during skid control, integral-control signal component Iout is maintained at the initial value Iout(01) of the integral-control signal component, calculated just before skid-control start time t3.

Unlike setting of integral-control signal component Iout performed by the PI-controller equipped deceleration feedback control system shown in FIGS. 12A-12F just after skid-control termination time t5, the braking force control apparatus of the embodiment shown in FIGS. 2-4 can set or initialize the initial value Iout(02) of integral-control signal component Iout to be used when restarting the deceleration feedback control to the difference (memTdcom−Pout(k)) between desired braking force memorized value memTdcom and the current proportional-control signal component Pout(k) calculated through step S2 (see a decrement of proportional-control signal component Pout(k) denoted by "D" in FIG. 5F and the arithmetic calculation represented by the expression Iout(k)=memTdcom−Pout(k) in step S13). Owing to the optimal setting or initializing (see the decreasingly compensated integral-control signal component Iout at the time t5 of FIG. 5F) of the initial value Iout(02) of integral-control signal component Iout performed by the apparatus of the embodiment when restarting the deceleration feedback control, even when a rapid change in desired deceleration αdem occurs owing to the further brake-pedal depression during skid control, desired braking force Tdcom (=Pout(k)+Iout(k)) can be properly decreasingly compensated for or reduced by the proportional-control signal component Pout(k) indicated by "D" in FIG. 5E, as compared to the feedback control system that exhibits the simulation results shown in FIGS. 12A-12F. As can be seen from the simulation result shown in FIG. 5E, desired braking force Tdcom of skid-control termination time t5 can be set to be substantially identical to desired braking force memorized value memTdcom of skid-control start time t3. By virtue of the previously-discussed optimal setting of the initial value Iout(02) of integral-control signal component Iout based on desired braking force memorized value memTdcom of skid-control start time t3, at skid-control termination time t5 from which deceleration feedback control restarts, the braking-force deviation |Td−Tdcom| between actual braking force Td and desired braking force Tdcom can be largely reduced to a small value E (see FIG. 5E), as compared to the greater value (D+E) shown in FIG. 12E.

Under the condition where the braking-force deviation |Td−Tdcom| is largely reduced to the small value E (see FIG. 5E) and additionally deceleration deviation Δα (=αdem−αv) is greatly increased due to interruption of deceleration feedback control in presence of a further brake-pedal depression (an increase in desired deceleration αdem) during skid control, the braking force control based on deceleration feedback control (PI control) is resumed. Deceleration deviation Δα (=αdem−αv) of skid-control termination time t5 is mainly compensated for by integral-control signal component Iout (k), which is initialized to the difference (memTdcom−Pout (k)) between desired braking force memorized value memTdcom and proportional-control signal component Pout(k) at the time t5. With the initial value Iout(02) (=memTdcom−Pout(k)) of the integral-control signal component properly compensated for or initialized at skid-control termination time t5, in the apparatus of the embodiment of FIG. 4, as can be seen from the moderate change in actual deceleration αv encircled by the phantom line H in FIG. 5D, actual deceleration αv, greatly deviated from desired deceleration αdem, can be moderately increased and brought closer to desired deceleration αdem from skid-control termination time t5. Therefore, even in presence of a rapid increase in desired deceleration αdem owing to the further brake-pedal depression at the time t4 during the skid-control time period t3-t5, it is possible to effectively eliminate any unnatural feeling that the vehicle deceleration is changing rapidly against the driver's wishes.

Figure 6:
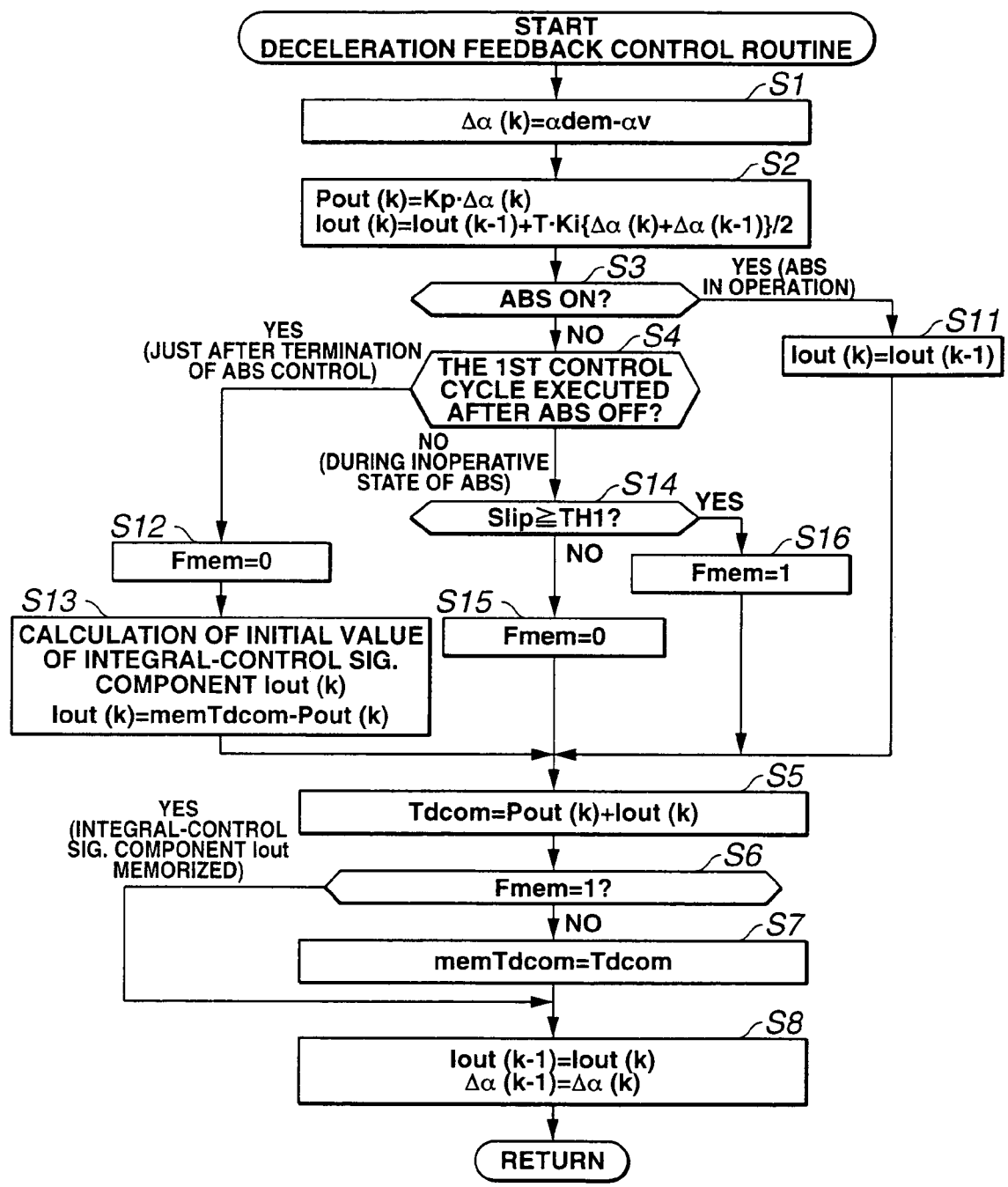
FIG. 6 is a flow chart illustrating the first modified desired braking force arithmetic-and-logic processing.

Referring now to FIG. 6, there is shown the first modified desired braking force arithmetic-and-logic processing, executable by the processor of the microcomputer of brake control unit 20. The modified arithmetic and logic processing shown in FIG. 6 is also executed as time-triggered interrupt routines to be triggered every predetermined sampling time intervals such as 10 milliseconds. The modified routine of FIG. 6 is similar to the routine of FIG. 4, except that steps S9-S10 are canceled and in lieu thereof steps S14-S16 are newly added between steps S4 and S5. Thus, the same step numbers used to designate steps in the routine shown in FIG. 4 will be applied to the corresponding step numbers used in the modified routine shown in FIG. 6, for the purpose of comparison of the two different interrupt routines. Steps S14, S15, and S16 will be hereinafter described in detail with reference to the accompanying drawings, while detailed description of steps S1-S8 and S11-S13 will be omitted because the above description thereon seems to be self-explanatory.

On the one hand, in the previously-described routine shown in FIG. 4, as can be appreciated from step S9 of FIG. 4 (check for ABS OFF→ON), the timing of memory for desired braking force memorized value memTdcom is timed to coincide with skid-control start time t3. On the other hand, in the modified routine shown in FIG. 6, as can be appreciated from step S14 of FIG. 6 (check for $S_{lip} \geq TH1$), the timing of memory for desired braking force memorized value memTdcom is timed to coincide with a point of time when a slip rate $S_{lip}$ of road wheel 1 exceeds a predetermined threshold value TH1, such as 0.05. Predetermined threshold value TH1 is set to a value somewhat less than an anti-skid control starting period criterion (a reference slip rate at a skidding point at which a skid would start), such as 0.1. As hereinafter described in detail, the system executing the first modified routine of FIG. 6 can provide the same effects as the system of FIGS. 4 and 5A-5F, and also suppress an increase in the integral of the error signal resulting from a deceleration slip or a skid developed during a time period from the skidding point at which a wheel lock-up tendency starts to increase to skid-control start time t3. That is to say, the aim in the first modified routine shown in FIG. 6 (containing new steps S14-S16) is to effectively suppress the deceleration feedback control system from being undesirably affected by the integral of the error signal resulting from a deceleration slip or a skid developed during a time period from the skidding point to skid-control start time t3, by determining the timing of memory for desired braking force memorized value memTdcom based on the comparison result ($S_{lip} \geq TH1$) of the actual slip rate Slip of road wheel 1 and its threshold value TH1, instead of using the skid-control start time t3. Concretely, in order to effectively suppress the deceleration feedback control system from being undesirably affected by the integral of the error signal (deceleration deviation Δα=αdem−αv) resulting from the deceleration slip, the following steps S14-S16 are provided.

At step S14, which is selected and repeatedly executed during the inoperative (OFF) state of the ABS system, a check is made to determine whether the deceleration slip rate Slip is greater than or equal to predetermined threshold value TH1. When the answer to step S14 is affirmative ($S_{lip} \geq TH1$), the routine proceeds from step S14 to step S16. Conversely when the answer to step S14 is negative ($S_{lip} < TH1$), the routine proceeds from step S14 to step S15.

At step S15, memory flag Fmem is maintained at the reset state, that is, Fmem=0, until the condition defined by the inequality $S_{lip} \geq TH1$ becomes satisfied.

At step S16, memory flag Fmem is set (=1), as soon as the condition defined by the inequality $S_{lip} \geq TH1$ is satisfied.

By virtue of the provision of steps S14-S16, in the deceleration feedback control system executing the modified routine of FIG. 6, at a point tm (described later) of time when the condition defined by the inequality $S_{lip} \geq TH1$ has been satisfied, memory flag Fmem has been set (=1) through step S16. Therefore, from the time point (the memory timing tm) when the condition defined by the inequality $S_{lip} \geq TH1$ has been satisfied, the routine of FIG. 6 flows from step S6 to step S8, while skipping step S7. As a result of this, desired braking force Tdcom, calculated at memory timing tm somewhat phase-advanced as compared to skid-control start time t3, can be memorized as desired braking force memorized value memTdcom. At step S13, the initial value Iout(02) of integral-control signal component Iout for vehicle-deceleration feedback control (PI control), used or needed when restarting the deceleration feedback control just after termination of the anti-skid cycle, is calculated from the expression Iout(k) =memTdcom−Pout(k), based on the desired braking force memorized value memTdcom corresponding to desired braking force Tdcom calculated at memory timing tm somewhat phase-advanced from skid-control start time t3.

The details of the operation and effects of the automatic deceleration feedback control system executing the modified routine of FIG. 6 are hereunder described in reference to the time charts shown in FIGS. 7A-7F. FIGS. 7A-7F show simulation results for a braking force control action obtained by the deceleration feedback control system equipped vehicle using deceleration controller 32 executable the modified routine of FIG. 6, under the same specified condition as the simulations shown in FIGS. 12A-12F or FIGS. 5A-5F. During the time period t3-t5 from skid-control start time t3 to skid-control termination time t5, that is, during skid control, integral-control signal component Iout is maintained at the initial value Iout(01) of the integral-control signal component, calculated just before skid-control start time t3. As can be seen from the time charts of FIGS. 7A-7F, in particular, FIGS. 7B and 7E, the initial value Iout(02) of integral-control signal component Iout for vehicle-deceleration feedback control (PI control), used or needed when restarting the deceleration feedback control just after termination of the anti-skid cycle, is calculated from the expression Iout(k)=memTdcom−Pout(k), based on desired braking force Tdcom calculated at memory timing tm somewhat phase-advanced from skid-control start time t3 and stored as the desired braking force memorized value memTdcom in the predetermined memory address. Phase-advancing the timing that memorizes desired braking force memorized value memTdcom from skid-control start time t3 to memory timing tm, is effective to suppress or reduce the deceleration feedback control system from being undesirably affected by the integral of the error signal resulting from the deceleration slip developed during the time period from the skidding point substantially corresponding to memory timing tm to skid-control start time t3. More concretely, as can be seen from the time chart of FIG. 7E, the integral (integral-control signal component Iout) of the error signal (deceleration deviation Δα=αdem−αv) resulting from the deceleration slip can be reduced by a value J.

As appreciated from comparison between the simulation results shown in FIGS. 5E and 7E, desired braking force Tdcom of skid-control termination time t5 can be further reduced by the value J as compared to the simulation result shown in FIG. 5E. By virtue of the previously-discussed optimal setting or initializing of the initial value Iout(02) of integral-control signal component Iout based on desired braking force memorized value memTdcom of memory timing tm slightly phase-advanced from skid-control start time t3, at skid-control termination time t5 from which deceleration feedback control restarts, the braking-force deviation |Td−Tdcom| of actual braking force Td from desired braking force Tdcom can be further reduced to a smaller value L (see FIG. 7E) than the value E (see FIG. 5E). From skid-control termination time t5, as can be seen from a change in actual deceleration αv encircled by the phantom line M in FIG. 7D, actual deceleration αv can be increased and brought closer to desired deceleration αdem more moderately rather than the moderate change in actual deceleration αv encircled by the phantom line H in FIG. 5D. Therefore, even in presence of a rapid increase in desired deceleration αdem owing to the further brake-pedal depression at the time t4 during the skid-control time period t3-t5, it is possible to more effectively eliminate any unnatural feeling that the vehicle deceleration is changing rapidly against the driver's wishes.

Figure 8:
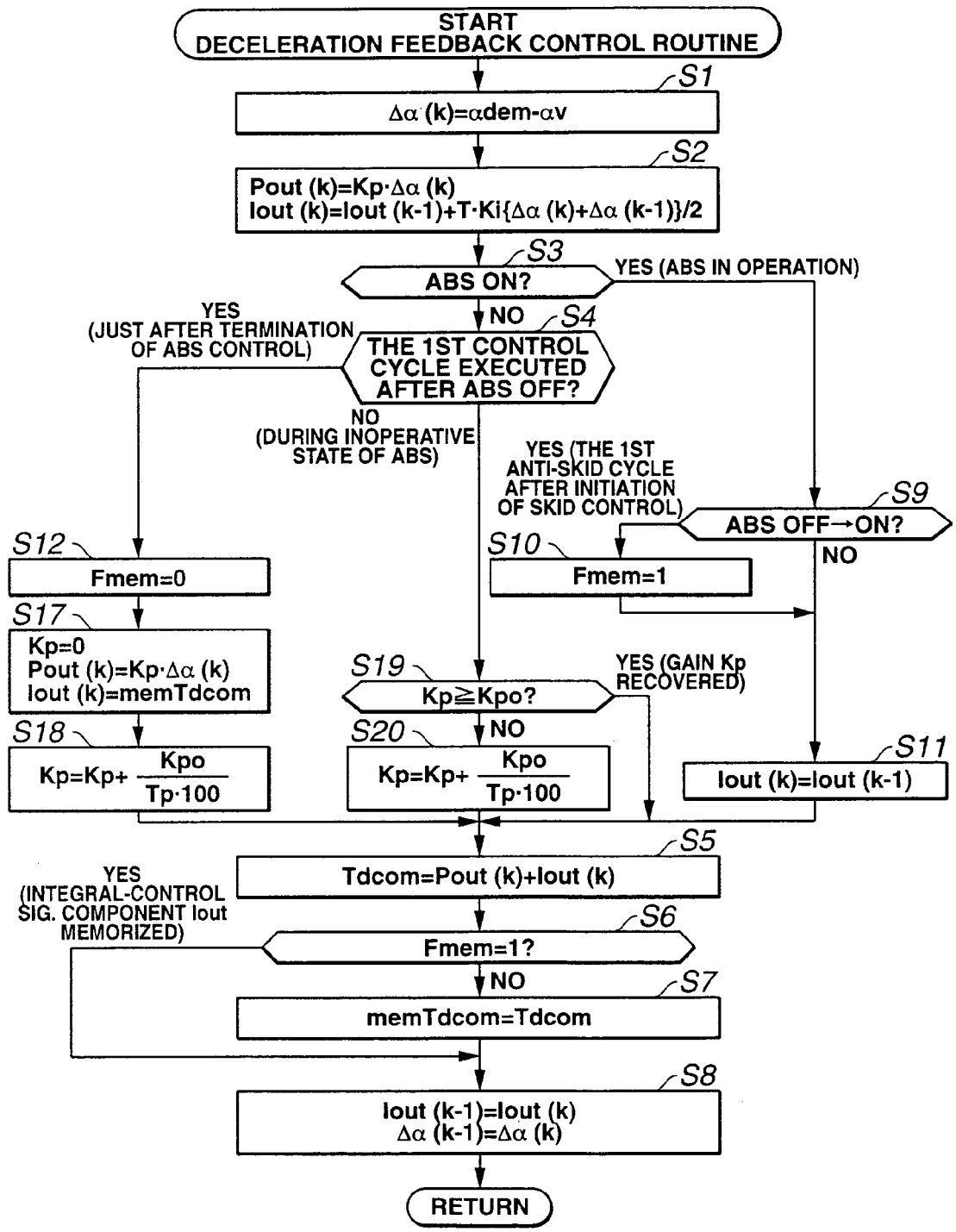
FIG. 8 is a flow chart illustrating the second modified desired braking force arithmetic-and-logic processing.

Referring now to FIG. 8, there is shown the second modified desired braking force arithmetic-and-logic processing, executable by the processor of the microcomputer of brake control unit 20. The modified arithmetic and logic processing shown in FIG. 8 is also executed as time-triggered interrupt routines to be triggered every predetermined sampling time intervals such as 10 milliseconds. The modified routine of FIG. 8 is similar to the routine of FIG. 4, except that step S13 of FIG. 4 is replaced with steps S17-S18 and new steps S19-S20 are added between steps S4 and S5. Thus, the same step numbers used to designate steps in the routine shown in FIG. 4 will be applied to the corresponding step numbers used in the modified routine shown in FIG. 8, for the purpose of comparison of the two different interrupt routines. Steps S17-S20 will be hereinafter described in detail with reference to the accompanying drawings, while detailed description of steps S1-S12 will be omitted because the above description thereon seems to be self-explanatory.

On the one hand, in the previously-described routines shown in FIGS. 4 and 6, as can be appreciated from step S13 of FIGS. 4 and 6, (initialization of integral-control signal component Iout(k), executed when resuming the deceleration feedback control at skid-control termination time t5, i.e., that is to say, Iout(k)=Iout(02)=memTdcom−Pout(k)), the initial value of desired braking force Tdcom is calculated or derived by initializing integral-control signal component Iout (see the flow from step S13 to step S5 in FIGS. 4 and 6, and the expression Tdcom=Pout(k)+Iout(02)=Pout(k)+{memTdcom−Pout(k)}=memTdcom). On the other hand, in the modified routine shown in FIG. 8, as can be appreciated from step S17 of FIG. 8, the initial value of desired braking force Tdcom is calculated or derived by initializing adjustable gain Kp for the proportional term (see the flow from step S17 via step S18 to step S5 in FIG. 8), in other words, by initializing proportional-control signal component Pout. That is to say, the aim in the second modified routine shown in FIG. 8 (containing new steps S17-S20) is to provide the same effects as the system of FIGS. 4 and 5A-5F by way of initialization of proportional-control signal component Pout(k) to a predetermined small value such as "0" (in other words, initialization of proportional-control gain Kp to a predetermined small value such as "0") at skid-control termination time t5.

At step S17, which is selected and executed only once just after skid-control termination time t5, proportional-control gain Kp is temporarily initialized to "0", that is, Kp=0. Additionally, at step S17, proportional-control signal component Pout(k) is calculated from the expression Pout(k)=Kp·Δα(k), on the basis of the proportional-control gain Kp initialized to "0" and the current deceleration deviation Δα(k). Proportional-control gain Kp is initialized to "0" just after skid-control termination time t5, that is, Kp=0, and thus proportional-control signal component Pout(k) is also initialized to "0", because of Pout(k)=Kp·Δα(k)=0×Δα(k)=0. At the same time, at step S17, the current integral-control signal component Iout(k) is set or initialized to the same value as desired braking force memorized value memTdcom, which is memorized through step S7, from the following expression.

Iout(k)=Iout(02)=memTdcom−Pout(k)=memTdcom−Kp·Δα(k)=memTdcom−0×Δα(k)=memTdcom

Therefore, in the system executing the second modified routine shown in FIG. 8, step S17 serves as an anti-skid cycle termination time integral-control signal component initialization section (or anti-skid cycle termination time integral-control signal component initialization means) and an anti-skid cycle termination time proportional-control signal component initialization section (or anti-skid cycle termination time proportional-control signal component initialization means).

At step S18, for the next execution cycle, proportional-control gain Kp is updated according to the expression Kp=Kp+(Kpo)/(Tp·100), where Kpo denotes a predetermined design proportional-control gain, such as 265.66518, and Tp denotes a set time or a predetermined recovery time, such as 1 second, needed to recover proportional-control gain Kp from the initial value "0" to design proportional-control gain Kpo (>0).

As set forth above, proportional-control signal component Pout(k) is temporarily initialized to "0" at skid-control termination time t5. Therefore, in determining or calculating desired braking force Tdcom at step S5 as the summed value (Pout(k)+Iout(k)) of the current proportional-control signal component Pout(k) and the current integral-control signal component Iout(k), it is possible to prevent or avoid proportional-control signal component Pout(k) from being included in desired braking force Tdcom used or needed when restarting the deceleration feedback control just after termination of the anti-skid cycle, because of advantageous initialization of integral-control signal component Pout(k), that is, Pout(k)=0.

At step S19, which is selected and repeatedly executed during the inoperative (OFF) state of the ABS system, a check is made to determine whether proportional-control gain Kp is greater than or equal to design proportional-control gain Kpo. When the answer to step S19 is affirmative (Kp≧Kpo), that is, proportional-control gain Kp has recovered to design proportional-control gain Kpo, the routine proceeds from step S19 directly to step S5, while skipping step S20. Conversely when the answer to step S19 is negative (Kp<Kpo), that is, proportional-control gain Kp has not recovered to design proportional-control gain Kpo, the routine proceeds from step S19 via step S20 to step S5.

During repetitive executions of step S20, proportional-control gain Kp, which has been temporarily initialized to "0", recovers gradually to design proportional-control gain Kpo by way of an asymptotic increase in proportional-control gain Kp to the value {Kp+(Kpo)/(Tp·100)} calculated by the same arithmetic expression Kp=Kp+(Kpo)/(Tp·100) as step S18. During the inoperative (OFF) state of the ABS system, step S20 is repeatedly executed until proportional-control gain Kp has recovered to design proportional-control gain Kpo. Thus, during the inoperative (OFF) state of the ABS system, proportional-control gain Kp, recovering asymptotically gradually to design proportional-control gain Kpo, is used for calculation of proportional-control signal component Pout(k), executed at step S2.

Skipping step S20 under the condition of Kp≧Kpo means that proportional-control gain Kp is fixed to design proportional-control gain Kpo (>0).

As discussed above in reference to the flow chart of FIG. 8, proportional-control gain Pout(k), which has been temporarily initialized to "0" at skid-control termination time t5, can asymptotically increase gradually to design proportional-control gain Kpo every executions of arithmetic calculation of step S2 from skid-control termination time t5. Desired braking force Tdcom calculated through step S5 as the summed value (Pout(k)+Iout(k)) of the current proportional-control signal component Pout(k) and the current integral-control signal component Iout(k), can also recover asymptotically gradually to a normal value determined based on the driver's braking action, until the predetermined recovery time Tp expires since skid-control termination time t5.

The details of the operation and effects of the automatic deceleration feedback control system executing the modified routine of FIG. 8 are hereunder described in reference to the time charts shown in FIGS. 9A-9G. FIGS. 9A-9G show simulation results for a braking force control action obtained by the deceleration feedback control system equipped vehicle using deceleration controller 32 executable the modified routine of FIG. 8, under the same specified condition as the simulations shown in FIGS. 12A-12F, FIGS. 5A-5F or FIGS. 7A-7F. During the time period t3-t5 from skid-control start time t3 to skid-control termination time t5, that is, during skid control, integral-control signal component Iout is maintained at the initial value Iout(01) of the integral-control signal component, calculated just before initiation of skid control, i.e., just before skid-control start time t3. As can be seen from the time charts of FIGS. 9A-9G, in particular, FIG. 9F, at skid-control termination time t5 integral-control signal component Iout(k) can be initialized to desired braking force memorized value memTdcom of skid-control start time t3 (see the time point t5 of FIG. 9F and the expression Iout(k)=memTdcom of step S17 of FIG. 8), and additionally at skid-control termination time t5 proportional-control gain Kp can be temporarily initialized to "0" and as a result proportional-control signal component Pout(k) can be temporarily initialized to "0" (see the time point t5 of FIG. 9G and the expressions Kp=0 and Pout(k)=Kp·Δα(k)=0×Δα(k)=0 of step S17 of FIG. 8). Therefore, even when a rapid increase in desired deceleration αdem occurs owing to the further brake-pedal depression at the time t4 during the skid-control time period t3-t5, it is possible to prevent a change in proportional-control signal component Pout(k), occurring owing to the rapid increase in desired deceleration αdem, from being included in desired braking force Tdcom calculated as the summed value (Pout(k)+Iout(k)). Thus, desired braking force Tdcom (=Pout(k)+Iout(k)), used or needed when restarting the deceleration feedback control at skid-control termination time t5, can be properly decreasingly compensated for or reduced by the proportional-control signal component Pout(k) indicated by "D" in FIG. 9E, as compared to the feedback control system that exhibits the simulation results shown in FIGS. 12A-12F. As can be seen from the simulation result shown in FIG. 9E, desired braking force Tdcom of skid-control termination time t5 can be set to be substantially identical to desired braking force memorized value memTdcom of skid-control start time t3. By virtue of the previously-discussed advantageous initialization of proportional-control signal component Pout to the predetermined small value such as "0", at skid-control termination time t5 from which deceleration feedback control restarts, the braking-force deviation |Td-Tdcom| between actual braking force Td and desired braking force Tdcom can be largely reduced to a small value E (see FIG. 9E), as compared to the greater value (D+E) shown in FIG. 12E.

Under the condition where the braking-force deviation |Td−Tdcom| is largely reduced to the small value E (see FIG. 9E) and additionally deceleration deviation Δα(=αdem−αv) is greatly increased due to interruption of deceleration feedback control in presence of a further brake-pedal depression (an increase in desired deceleration αdem) during skid control, the braking force control based on deceleration feedback control (PI control) is resumed. Deceleration deviation Δα (=αdem−αv) of skid-control termination time t5 is mainly compensated for by integral-control signal component Iout(k), which is initialized to desired braking force memorized value memTdcom at the time t5. With the initial value Iout (02) (=memTdcom) of the integral-control signal component properly compensated for or initialized at skid-control termination time t5, in the system executing the second modified routine of FIG. 8, as can be seen from the moderate change in actual deceleration αv encircled by the phantom line H in FIG. 9D, actual deceleration αv, greatly deviated from desired deceleration αdem, can be moderately increased and brought closer to desired deceleration αdem from the skid-control termination time t5. Therefore, even in presence of a rapid increase in desired deceleration αdem owing to the further brake-pedal depression at the time t4, it is possible to effectively eliminate any unnatural feeling that the vehicle deceleration is changing rapidly against the driver's wishes.

As set forth above, in the system executing the second modified routine of FIG. 8, at skid-control termination time t5 proportional-control gain Kp is temporarily initialized to "0" and also proportional-control signal component Pout(k) is temporarily initialized to "0". Thereafter, proportional-control gain Kp gradually recovers from "o" to design proportional-control gain Kpo for recovery time Tp. In a similar manner, proportional-control signal component Pout(k) gradually recovers and increases from "0" to the normal value determined based on the driver's braking action, for recovery time Tp. Therefore, by optimally setting the recovery time Tp, it is possible to enhance the following performance of actual deceleration αv with respect to desired deceleration αdem without any unnatural feeling that the vehicle deceleration is changing rapidly against the driver's wishes, even in presence of a remarkable increase in desired deceleration αdem, resulting from a further brake-pedal depression, during skid control.

Figure 10:
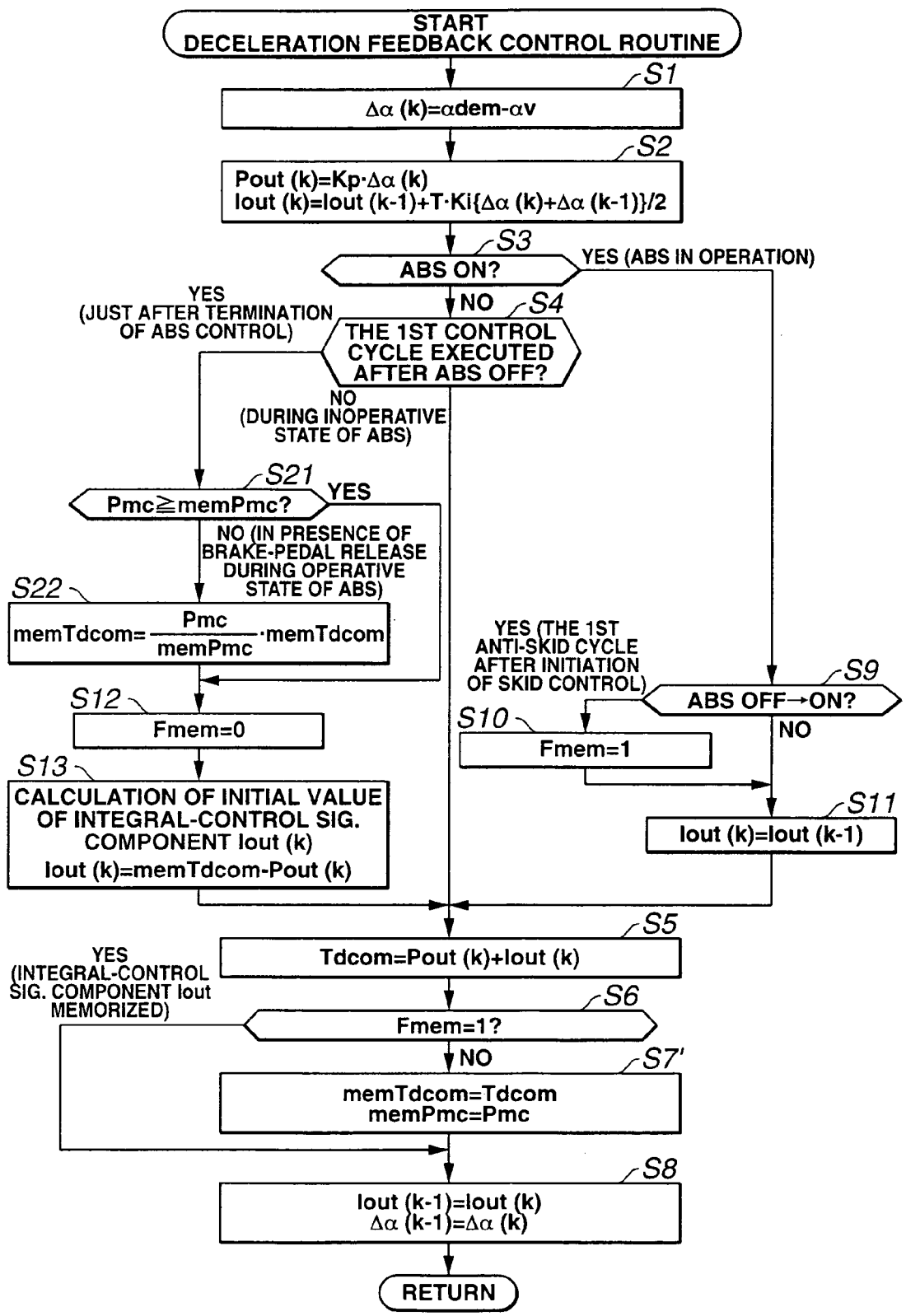
FIG. 10 is a flow chart illustrating the third modified desired braking force arithmetic-and-logic processing.

Referring now to FIG. 10, there is shown the third modified desired braking force arithmetic-and-logic processing, executable by the processor of the microcomputer of brake control unit 20. The modified arithmetic and logic processing shown in FIG. 10 is also executed as time-triggered interrupt routines to be triggered every predetermined sampling time intervals such as 10 milliseconds. The modified routine of FIG. 10 is similar to the routine of FIG. 4, except that step S7 of FIG. 4 is replaced with step S7' somewhat modified from step S7 and new steps S21-S22 are added between S4 and S12. Thus, the same step numbers used to designate steps in the routine shown in FIG. 4 will be applied to the corresponding step numbers used in the modified routine shown in FIG. 10, for the purpose of comparison of the two different interrupt routines. Steps S7' and S21-S22 will be hereinafter described in detail with reference to the accompanying drawings, while detailed description of steps S1-S6, S8-S13 will be omitted because the above description thereon seems to be self-explanatory.

Step S7' occurs, under a condition where the ABS system is kept in the inoperative (OFF) state and thus memory flag Fmem is reset (=0).

At step S7' of FIG. 10, which is slightly modified from step S7 of FIGS. 4, 6, and 8, desired braking force memorized value memTdcom is repeatedly updated by desired braking force Tdcom (=Pout(k)+Iout(k)), calculated through step S5, that is, memTdcom=Tdcom. At the same time, at step S7', a master-cylinder pressure memorized value (or a brake-pedal manipulated variable memorized value) memPmc is repeatedly updated by master-cylinder pressure (or the driver's brake-pedal pressure) Pmc detected by pressure sensor 21. Just after skid-control start time t3, memory flag Fmem is switched to the set state (Fmem=1) through step S10. Thus, during repeated executions of the anti-skid cycle, the routine flows from step S6 to step S8, while skipping step S7'. Skipping step S7' under the condition of Fmem=1 means that desired braking force memorized value memTdcom is fixed to the desired braking force Tdcom calculated just before skid-control start time t3. As a result, the desired braking force Tdcom, calculated just before skid-control start time t3, is memorized as desired braking force memorized value memTdcom of skid-control start time t3. Skipping step S7' under the condition of Fmem=1 also means that master-cylinder pressure memorized value memPmc is fixed to the master-cylinder pressure Pmc detected just before skid-control start time t3. As a result, the master-cylinder pressure Pmc, detected just before skid-control start time t3, is memorized as master-cylinder pressure memorized value memPmc of skid-control start time t3.

On the one hand, in the previously-described routines shown in FIGS. 4, 6, and 8, as can be appreciated from the increment B corresponding to an increment of proportional-control signal component Pout resulting from further brake-pedal depression in FIGS. 5E, 7E, and 9E, the systems executing the respective routines shown in FIGS. 4, 6, and 8 are all adopted as effective countermeasures against an undesirable increase in desired deceleration αdem arising from a further brake-pedal depression occurring during skid control. On the other hand, in the modified routine shown in FIG. 10, as can be appreciated from a decrement B' corresponding to a decrement of proportional-control signal component Pout resulting from a brake-pedal release in FIG. 11E, the system executing the routine shown in FIG. 10 is adopted as an effective countermeasure against an undesirable decrease in desired deceleration αdem arising from a brake-pedal release occurring during skid control. That is to say, the aim in the third modified routine shown in FIG. 10 (containing new steps S7, and S21-S22) is to provide the same effects as the system of FIGS. 4, 6, and 8, even in presence of a remarkable decrease in desired deceleration αdem, resulting from a brake-pedal release, during skid control.

At step S21, which is selected and executed only once just after skid-control termination time t5, a check is made to determine whether master-cylinder pressure Pmc of the current control cycle is greater than or equal to master-cylinder pressure memorized value memPmc of skid-control start time t3, which memorized value memPmc is calculated through step S7'. In other words, the presence or absence of a change in brake-pedal depression by the driver during the skid-control time period t3-t5 can be determined through step S21. The inequality defined by Pmc≧memPmc means that there is no brake-pedal release during skid control. The inequality defined by Pmc<memPmc means that there is a brake-pedal release during skid control. Concretely, when the answer to step S21 is affirmative (Pmc≧memPmc) and thus there is no brake-pedal release during skid control, the routine proceeds from step S21 directly to step S12, while skipping step S22. Conversely when the answer to step S21 is negative (Pmc<memPmc) and thus there is a brake-pedal release during skid control, the routine proceeds from step S21 via step S22 to step S12.

At step S22, a corrected value memTdcom(k) of desired braking force memorized value memTdcom of skid-control start time t3 is arithmetically calculated based on (i) a braking-action decreasing rate (Pmc/memPmc) of master-cylinder pressure Pmc of skid-control termination time t5 to master-cylinder pressure memorized value memPmc of skid-control start time t3 and (ii) desired braking force memorized value memTdcom of skid-control start time t3, from the following expression.

$$memTdcom(k) = memTdcom = \{(Pmc)/(memPmc)\} \times memTdcom$$

That is to say, through step S22, desired braking force memorized value memTdcom is updated by the product {(Pmc)/(memPmc)}×memTdcom (<memTdcom, because of Pmc<memPmc) of braking-action decreasing rate (Pmc/memPmc) and desired braking force memorized value memTdcom of skid-control start time t3. Therefore, step S22 serves as a braking-action decreasing rate calculation section (or braking-action decreasing rate calculation means), and also serves as a desired braking force memorized value correction section (or desired braking force memorized value correction means). Thereafter, the routine flows from step S22 via step S12 to step S13. In case of the flow from step S21 through steps S22 and S12 to step S13, the initial value Iout(02) of integral-control signal component Iout, calculated through step S13, is arithmetically calculated by subtracting the current proportional-control signal component Pout(k) calculated through step S2 from the previously-noted corrected value {(Pmc)/(memPmc)}×memTdcom, as follows.

$$Iout(k) = memTdcom - Pout(k) = \{(Pmc)/(memPmc)\} \times memTdcom) - Pout(k)$$

The details of the operation and effects of the automatic deceleration feedback control system executing the modified routine of FIG. 10 are hereunder described in reference to the time charts shown in FIGS. 11A-11F. FIGS. 11A-11F show simulation results for a braking force control action obtained by the deceleration feedback control system equipped vehicle using deceleration controller 32 executable the modified routine of FIG. 10, under a specified condition. The specified condition is a condition where a rise in a master-cylinder pressure Pmc occurs owing to the driver's brake-pedal depression at the time t1, a friction factor μ of a road surface changes from high to low at the time t2, the ABS system comes into operation at the time t3, a reduction by half of master-cylinder pressure Pmc occurs owing to a half release of brake pedal 3 at the time t4, the anti-skid cycle terminates owing to a transition from the low-μ road-surface state to the high-μ road-surface state at the time t5, and the automatic deceleration feedback control restarts from the time t5.

As shown in FIGS. 11A and 1D, a desired deceleration αdem becomes identical to an equivalent deceleration value determined based on a rise in master-cylinder pressure Pmc at the time t1 when master-cylinder pressure Pmc rises in a substantially stepwise manner. Desired deceleration αdem decreases in a substantially stepwise manner by an equivalent deceleration value determined based on a fall in master-cylinder pressure Pmc at the time t4 when a half release of brake pedal 3 occurs.

During a time period t1-t2 from the time t1 when the rise in master-cylinder pressure Pmc occurs to the time t2 when friction factor μ of the road surface changes from high to low and thus a skid starts to develop, desired braking force Tdcom is determined as a value A (see FIG. 1E), corresponding to an initial brake-pedal depression. In case of the use of the PI controller, desired braking force Tdcom is calculated as the sum (Pout+Iout) of proportional-control signal component Pout proportional to the error signal corresponding to the deviation |αv−αdem| between actual deceleration αv and desired deceleration αdem and integral-control signal component Iout corresponding to the integral of the error signal indicating deviation |αv−αdem|. From the time t1, actual braking force Td is converged or brought closer to desired braking force Tdcom (see FIG. 11E). During the time period t1-t2, the road-surface friction factor μ is still high, and thus actual deceleration αv tends to follow desired deceleration αdem very well (see FIG. 11D). This means a small error signal value, that is, a small deceleration deviation |αv−αdem|, in other words, a small proportional-control signal component Pout and a small integral-control signal component Iout. That is, desired braking force Tdcom, corresponding to the sum (Pout+Iout) of proportional-control signal component Pout and integral-control signal component Iout, is varying responsively to a change in desired deceleration αdem (see FIGS. 11D-11E).

During a time period t2-t3 from the time t2 when the road-surface friction factor μ changes from high to low and thus a skid starts to develop to the time t3 when the ABS system comes into operation to prevent the wheel lock-up condition, the deviation |αv−αdem| tends to gradually increase owing to the increased wheel lock-up tendency (see the gradually increased difference between actual deceleration αv indicated by the solid line in FIG. 11D and desired deceleration αdem indicated by the broken line in FIG. 11D). As a result of the gradual increase in deviation |αv−αdem|, the integral of the error signal indicative of deviation |αv−αdem| tends to increase and thus the integral-control signal component Iout corresponding to the integral of the error signal indicative of deviation |αv−αdem| also increases up to a value C (see FIG. 11E). The integral-control signal component Iout increased up to the value C is accumulated in the integrator (see FIG. 11F). During the time period t2-t3, although desired deceleration αdem remains unchanged (see the broken line in FIG. 11D), desired braking force Tdcom tends to become greater owing to the integral-control signal component Iout accumulated in the integrator, as indicated by the value C in FIG. 11E.

During a time period t3-t4 from the time t3 when the ABS system comes into operation to the time t4 when the further rise in master-cylinder pressure Pmc occurs, the wheel lock-up tendency is suppressed by way of repetitive executions of the anti-skid cycle and thus an increase in deviation |αv−αdem| of actual deceleration αv from desired deceleration αdem is effectively suppressed (see the time period t3-t4 in FIG. 11D). During skid control, on the other hand, the integral-control signal component Iout is held at the integral of the error signal (corresponding to the deviation |αv−αdem| computed at the first anti-skid cycle (just before skid-control starting point t3). Thus, desired braking force Tdcom can be kept almost constant (see slight variations in desired braking force Tdcom during the time period t3-t4 in FIG. 11E).

At the time point t4 of the half release of brake pedal 3, deviation |αv−αdem| tends to rapidly decrease responsively to a decrease in desired deceleration αdem, resulting from the master-cylinder pressure drop (half release of brake pedal 3). Note that, due to the rapidly decreased deviation |αv−αdem| resulting from the brake-pedal release, the proportional-control signal component Pout also tends to decrease rapidly at the time t4. As a result, desired braking force Tdcom is rapidly decreased by a decrement B' at the time t4 (see the rapid change in desired braking force Tdcom indicated by the broken line in FIG. 11E). The decrement B' corresponds to a decrement of proportional-control signal component Pout resulting from the brake-pedal release.

In contrast to the above, assuming that the PI-controller equipped deceleration feedback control system shown in FIGS. 12A-12F is operating in presence of a decrease in desired deceleration αdem during skid control, integral-control signal component Iout to be used when restarting the deceleration feedback control is not initialized at skid-control termination time t5, but fixed to and held at the same value as integral-control signal component Iout of skid-control start time t3 during the skid-control time period t3-t5. As a result, at skid-control termination point t5, the braking-force deviation |Td−Tdcom| between actual braking force Td and desired braking force Tdcom becomes a great value (F'+E') (see FIG. 11E), in presence of a decrease in desired deceleration αdem during skid control. Suppose that only the integral controller (I controller) is used for deceleration feedback control and integral-control signal component Iout is held at the integral of the error signal (deceleration deviation Δα=αdem−αv) computed at the first anti-skid cycle. In such a case, at skid-control termination point t5, the braking-force deviation |Td−Tdcom| becomes a more greater value (D'+F'+E') (see FIG. 11E), in presence of a decrease in desired deceleration αdem during skid control.

On the other hand, according to the system executing the third modified routine of FIG. 10, the initial value Iout(02) of integral-control signal component Iout of skid-control termination time t5 can be initialized to the difference {(Pmc)/(memPmc)}×memTdcom)−Pout(k) obtained by subtracting the current proportional-control signal component Pout(k) from the previously-noted corrected value {(Pmc)/(memPmc)}×memTdcom), which corrected value is obtained by decreasingly compensating for the desired braking force memorized value memTdcom of skid-control start time t3 at the braking-action decreasing rate (Pmc/memPmc). Therefore, the initial value of desired braking force Tdcom of skid-control termination time t5 can be effectively reduced (see the rapid decrease in desired braking force Tdcom of skid-control termination time t5, indicated by the broken line of FIG. 11E). As a result, at skid-control termination time t5 from which deceleration feedback control restarts, the braking-force deviation |Td−Tdcom| between actual braking force Td and desired braking force Tdcom can be largely reduced to a small value E' (see FIG. 11E), as compared to the greater value produced by the PI-controller equipped deceleration feedback control system shown in FIGS. 12A-12F, in presence of a decrease in desired deceleration αdem during skid control.

Under the condition where the braking-force deviation |Td−Tdcom| is largely reduced to the small value E' (see FIG. 11E) at skid-control termination time t5, the braking force control based on deceleration feedback control (PI control) is resumed. Deceleration deviation Δα (=αdem−αv) of skid-control termination time t5 is mainly compensated for by integral-control signal component Iout(k), which is initialized to the difference {(Pmc)/(memPmc)}×memTdcom)−Pout(k) obtained by subtracting the current proportional-control signal component Pout(k) from the corrected value {(Pmc)/(memPmc)}×memTdcom) at the time t5. With the initial value Iout(02) (={(Pmc)/(memPmc)}×memTdcom)−Pout(k)) of the integral-control signal component properly compensated for or initialized at skid-control termination time t5, in the system executing the third modified routine of FIG. 10, as can be seen from the moderate change in actual deceleration αv encircled by the phantom line N in FIG. 11D, actual deceleration αv can be moderately increased and brought closer to desired deceleration αdem from the skid-control termination time t5. Therefore, even in presence of a rapid decrease in desired deceleration αdem owing to the brake-pedal release at the time t4, it is possible to effectively eliminate any unnatural feeling that the vehicle deceleration is changing rapidly against the driver's wishes.

It will be appreciated that the previously-discussed routines shown in FIGS. 4, 6, and 8, each of which is adopted as a countermeasure against an undesirable increase in desired deceleration αdem arising from a further brake-pedal depression occurring during skid control, can be properly combined with the routine shown in FIG. 10, which is adopted as a countermeasure against an undesirable decrease in desired deceleration αdem arising from a brake-pedal release occurring during skid control, so as to optimize a control action of a restarting period of deceleration feedback control even in presence of an increase and/or a decrease in desired deceleration αdem during skid control, while preventing an increase and/or a decrease in proportional-control signal component Pout occurring owing to the change in desired deceleration αdem from being directly reflected in the output signal substantially corresponding to the initial value of desired braking force Tdcom (=Pout+Iout) to be generated when resuming the deceleration feedback control from skid-control termination time t5.

In the shown embodiment, the automatic braking force control apparatus is exemplified in a four-wheel-brake cylinder equipped automotive vehicle with a brake-by-wire (BBW) hydraulic brake system. Instead of using a hydraulic braking system, an electromagnetic braking system or a pneumatic braking system may be used for braking-force control of an automotive vehicle.

The entire contents of Japanese Patent Application No. 2004-128585 (filed Apr. 23, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic braking force control apparatus for an automotive vehicle comprising:
    a deceleration detector that detects an actual deceleration of the vehicle;
    a braking force adjustment device that adjusts an actual braking force of a road wheel to a desired braking force; and
    a brake control unit configured to be electronically connected to the deceleration detector and the braking force adjustment device, for executing deceleration feedback control and anti-skid control, which are mutually exclusive; the brake control unit comprising:
        (a) a desired deceleration calculation section configured to calculate a desired deceleration based on a driver's braking action;
        (b) a desired braking force calculation section configured to calculate the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation;
        (c) an anti-skid control section configured to execute, irrespective of the desired braking force for the deceleration feedback control, an anti-skid cycle including at least a braking-force decrease mode and a braking-force increase mode, for preventing a wheel lock-up condition of the road wheel;
        (d) a desired braking force memorizing section configured to memorize the desired braking force, calculated just before a start time of the anti-skid cycle, as a desired braking force memorized value; and
        (e) a desired braking force initialization section configured to initialize the desired braking force needed when restarting the deceleration feedback control from a termination time of the anti-skid cycle to a predetermined value calculated based on the desired braking force memorized value.

2. The automatic braking force control apparatus as claimed in claim 1, wherein:
    the desired braking force initialization section comprises an anti-skid cycle termination time integral-control signal component initialization section configured to initialize the integral-control signal component of the desired braking force needed when restarting the deceleration feedback control from the anti-skid cycle termination time to a difference obtained by subtracting the proportional-control signal component from the desired braking force memorized value to derive an initial value of the integral-control signal component of the anti-skid cycle termination time; and
    the desired braking force initialization section is configured to calculate the desired braking force needed when restarting the deceleration feedback control from the anti-skid cycle termination time as a summed value of the initial value of the integral-control signal component of the anti-skid cycle termination time and the proportional-control signal component.

3. The automatic braking force control apparatus as claimed in claim 1, wherein:
    the desired braking force initialization section comprises an anti-skid cycle termination time integral-control signal component initialization section configured to initialize the integral-control signal component of the desired braking force needed when restarting the deceleration feedback control from the anti-skid cycle termination time to the desired braking force memorized value to derive an initial value of the integral-control signal component of the anti-skid cycle termination time, and an anti-skid cycle termination time proportional-control signal component initialization section configured to initialize the proportional-control signal component of the desired braking force needed when restarting the deceleration feedback control from the anti-skid cycle termination time to zero to derive an initial value of the proportional-control signal component of the anti-skid cycle termination time; and the desired braking force initialization section is configured to calculate the desired braking force needed when restarting the deceleration feedback control from the anti-skid cycle termination time as a summed value of the initial value of the integral-control signal component of the anti-skid cycle termination time and the initial value of the proportional-control signal component of the anti-skid cycle termination time.

4. The automatic braking force control apparatus as claimed in claim 3, wherein:

the anti-skid cycle termination time proportional-control signal component initialization section is configured to initialize the proportional-control signal component of the desired braking force needed when restarting the deceleration feedback control from the anti-skid cycle termination time to zero by initializing a proportional-control gain of the proportional-control signal component proportional to the error signal corresponding to the deviation to zero at the anti-skid cycle termination time; and the anti-skid cycle termination time proportional-control signal component initialization section is configured to recover the proportional-control gain, initialized at the anti-skid cycle termination time, gradually to a predetermined design gain until a predetermined recovery time, measured from the anti-skid cycle termination time, expires.

5. The automatic braking force control apparatus as claimed in claim 1, further comprising:

a pressure sensor that detects a manipulated variable of a brake pedal to estimate a magnitude of the driver's braking action, wherein the desired braking force initialization section comprises:

(a) a brake-pedal manipulated variable memorizing section configured to memorize the brake-pedal manipulated variable, detected just before the anti-skid cycle start time, as a brake-pedal manipulated variable memorized value;

(b) a comparing section configured to determine whether a decrease in the desired deceleration occurs during the anti-skid cycle by comparing the brake-pedal manipulated variable, detected at the anti-skid cycle termination time, with the brake-pedal manipulated variable memorized value of the anti-skid cycle start time;

(c) a braking-action decreasing rate calculation section configured to calculate a braking-action decreasing rate of the brake-pedal manipulated variable of the anti-skid cycle termination time to the brake-pedal manipulated variable memorized value of the anti-skid cycle start time in presence of the decrease in the desired deceleration;

(d) a desired braking force memorized value correction section configured to calculate a corrected value of the desired braking force memorized value as a product of the braking-action decreasing rate and the desired braking force memorized value; and (e) an anti-skid cycle termination time integral-control signal component initialization section configured to initialize the integral-control signal component of the desired braking force needed when restarting the deceleration feedback control from the anti-skid cycle termination time to a difference obtained by subtracting the proportional-control signal component from the corrected value of the desired braking force memorized value to derive an initial value of the integral-control signal component of the anti-skid cycle termination time; and wherein the desired braking force initialization section is configured to calculate the desired braking force needed when restarting the deceleration feedback control from the anti-skid cycle termination time as a summed value of the initial value of the integral-control signal component of the anti-skid cycle termination time and the proportional-control signal component.

6. The automatic braking force control apparatus as claimed in claim 1, wherein:

a timing of memory for the desired braking force memorized value is timed to coincide with a point of time when a slip rate of the road wheel exceeds a reference slip rate at a skidding point at which a skid of the road wheel starts.

7. The automatic braking force control apparatus as claimed in claim 1, wherein:

a timing of memory for the desired braking force memorized value is timed to coincide with a point of time when a slip rate of the road wheel exceeds a predetermined threshold value less than a reference slip rate at a skidding point at which a skid of the road wheel starts.

8. An automatic braking force control apparatus for an automotive vehicle comprising:

a deceleration detector that detects an actual deceleration of the vehicle;

a braking force adjustment device that adjusts an actual braking force of a road wheel to a desired braking force; and a brake control unit configured to be electronically connected to the deceleration detector and the braking force adjustment device, for executing deceleration feedback control and anti-skid control, which are mutually exclusive; the brake control unit comprising:

(a) a desired deceleration calculation section configured to calculate a desired deceleration based on a driver's braking action;

(b) a desired braking force calculation section configured to calculate the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation;

(c) an anti-skid control section configured to execute, irrespective of the desired braking force for the deceleration feedback control, an anti-skid cycle including at least a braking-force decrease mode at which the actual braking force of the road wheel reduces when a wheel lock-up condition of the road wheel, whose braking force is adjusted by the braking force adjustment device, occurs, and a braking-force increase mode at which the actual braking force increases when the wheel lock-up condition has been avoided by reducing the actual braking force applied to the road wheel;

(d) a desired braking force memorizing section configured to memorize the desired braking force, calculated just before a start time of the anti-skid cycle, as a desired braking force memorized value; and (e) a desired braking force initialization section configured to initialize the desired braking force needed when restarting the deceleration feedback control from a termination time of the anti-skid cycle to a predetermined value calculated based on the desired braking force memorized value, for preventing a change in the proportional-control signal component occurring owing to a change in the desired deceleration from being reflected in an output signal substantially corresponding to the desired braking force to be generated to the braking force adjustment device when restarting the deceleration feedback control from the anti-skid cycle termination time, even in presence of the change in the desired deceleration during the anti-skid cycle.

9. The automatic braking force control apparatus as claimed in claim 8, wherein:

the desired braking force initialization section comprises an anti-skid cycle termination time integral-control signal component initialization section configured to initialize the integral-control signal component of the desired braking force needed when restarting the deceleration feedback control from the anti-skid cycle termination time to a difference obtained by subtracting the proportional-control signal component from the desired braking force memorized value to derive an initial value of the integral-control signal component of the anti-skid cycle termination time; and the desired braking force initialization section is configured to calculate the desired braking force needed when restarting the deceleration feedback control from the anti-skid cycle termination time as a summed value of the initial value of the integral-control signal component of the anti-skid cycle termination time and the proportional-control signal component.

10. The automatic braking force control apparatus as claimed in claim 8, wherein:

the desired braking force initialization section comprises an anti-skid cycle termination time integral-control signal component initialization section configured to initialize the integral-control signal component of the desired braking force needed when restarting the deceleration feedback control from the anti-skid cycle termination time to the desired braking force memorized value to derive an initial value of the integral-control signal component of the anti-skid cycle termination time, and an anti-skid cycle termination time proportional-control signal component initialization section configured to initialize the proportional-control signal component of the desired braking force needed when restarting the deceleration feedback control from the anti-skid cycle termination time to zero to derive an initial value of the proportional-control signal component of the anti-skid cycle termination time; and the desired braking force initialization section is configured to calculate the desired braking force needed when restarting the deceleration feedback control from the anti-skid cycle termination time as a summed value of the initial value of the integral-control signal component of the anti-skid cycle termination time and the initial value of the proportional-control signal component of the anti-skid cycle termination time.

11. The automatic braking force control apparatus as claimed in claim 10, wherein:

the anti-skid cycle termination time proportional-control signal component initialization section is configured to initialize the proportional-control signal component of the desired braking force needed when restarting the deceleration feedback control from the anti-skid cycle termination time to zero by initializing a proportional-control gain of the proportional-control signal component proportional to the error signal corresponding to the deviation to zero at the anti-skid cycle termination time; and the anti-skid cycle termination time proportional-control signal component initialization section is configured to recover the proportional-control gain, initialized at the anti-skid cycle termination time, gradually to a predetermined design gain until a predetermined recovery time, measured from the anti-skid cycle termination time, expires.

12. The automatic braking force control apparatus as claimed in claim 8, further comprising:

a pressure sensor that detects a manipulated variable of a brake pedal to estimate a magnitude of the driver's braking action, wherein the desired braking force initialization section comprises:

(a) a brake-pedal manipulated variable memorizing section configured to memorize the brake-pedal manipulated variable, detected just before the anti-skid cycle start time, as a brake-pedal manipulated variable memorized value;

(b) a comparing section configured to determine whether a decrease in the desired deceleration occurs during the anti-skid cycle by comparing the brake-pedal manipulated variable, detected at the anti-skid cycle termination time, with the brake-pedal manipulated variable memorized value of the anti-skid cycle start time;

(c) a braking-action decreasing rate calculation section configured to calculate a braking-action decreasing rate of the brake-pedal manipulated variable of the anti-skid cycle termination time to the brake-pedal manipulated variable memorized value of the anti-skid cycle start time in presence of the decrease in the desired deceleration;

(d) a desired braking force memorized value correction section configured to calculate a corrected value of the desired braking force memorized value as a product of the braking-action decreasing rate and the desired braking force memorized value; and (e) an anti-skid cycle termination time integral-control signal component initialization section configured to initialize the integral-control signal component of the desired braking force needed when restarting the deceleration feedback control from the anti-skid cycle termination time to a difference obtained by subtracting the proportional-control signal component from the corrected value of the desired braking force memorized value to derive an initial value of the integral-control signal component of the anti-skid cycle termination time; and wherein the desired braking force initialization section is configured to calculate the desired braking force needed when restarting the deceleration feedback control from the anti-skid cycle termination time as a summed value of the initial value of the integral-control signal component of the anti-skid cycle termination time and the proportional-control signal component.

13. The automatic braking force control apparatus as claimed in claim 8, wherein:

a timing of memory for the desired braking force memorized value is timed to coincide with a point of time when a slip rate of the road wheel exceeds a reference slip rate at a skidding point at which a skid of the road wheel starts.

14. The automatic braking force control apparatus as claimed in claim 8, wherein:

a timing of memory for the desired braking force memorized value is timed to coincide with a point of time when a slip rate of the road wheel exceeds a predetermined threshold value less than a reference slip rate at a skidding point at which a skid of the road wheel starts.

15. An automatic braking force control apparatus for an automotive vehicle comprising:

a deceleration detector that detects an actual deceleration of the vehicle;

a wheel-speed sensor that detects a wheel speed of a road wheel;

a pressure sensor that detects a manipulated variable of a brake pedal;

a braking force adjustment device that adjusts an actual braking force of the road wheel to a desired braking force; and a brake control unit configured to be electronically connected to the deceleration detector, the wheel-speed sensor, the pressure sensor and the braking force adjustment device, for executing deceleration feedback control and anti-skid control which are mutually exclusive; the brake control unit comprising:

(i) an anti-skid control system having a data processing section programmed to perform the following:

a) detecting a wheel lock-up condition of the road wheel based on the wheel speed detected; and b) executing, irrespective of the desired braking force for the deceleration feedback control, an anti-skid cycle including at least a braking-force decrease mode and a braking-force increase mode, for preventing the wheel lock-up condition of the road wheel; and (ii) a deceleration feedback control system having a data processing section programmed to perform the following:

(a) calculating a desired deceleration based on the brake-pedal manipulated variable;

(b) calculating the desired braking force for the deceleration feedback control, as a summed value of a proportional-control signal component proportional to an error signal corresponding to a deviation between the desired deceleration and the actual deceleration, and an integral-control signal component corresponding to an integral of the error signal indicative of the deviation;

(c) memorizing the desired braking force, calculated just before a start time of the anti-skid cycle, as a desired braking force memorized value; and (d) initializing the desired braking force needed when restarting the deceleration feedback control from a termination time of the anti-skid cycle to a predetermined value substantially corresponding to the desired braking force memorized value in presence of an increase in the desired deceleration during the anti-skid cycle.

16. The automatic braking force control apparatus as claimed in claim 15, wherein the data processing section of the deceleration feedback control system is further programmed for:

(e) memorizing the brake-pedal manipulated variable, detected just before the anti-skid cycle start time, as a brake-pedal manipulated variable memorized value;

(f) determining whether a decrease in the desired deceleration occurs during the anti-skid cycle by comparing the brake-pedal manipulated variable, detected at the anti-skid cycle termination time, with the brake-pedal manipulated variable memorized value of the anti-skid cycle start time;

(g) calculating a braking-action decreasing rate of the brake-pedal manipulated variable of the anti-skid cycle termination time to the brake-pedal manipulated variable memorized value of the anti-skid cycle start time in presence of the decrease in the desired deceleration during the anti-skid cycle;

(h) calculating a corrected value of the desired braking force memorized value as a product of the braking-action decreasing rate and the desired braking force memorized value; and (i) initializing the desired braking force needed when restarting the deceleration feedback control from the anti-skid cycle termination time to a predetermined value substantially corresponding to the corrected value of the desired braking force memorized value in presence of the decrease in the desired deceleration during the anti-skid cycle.

17. The automatic braking force control apparatus as claimed in claim 15, wherein:

the desired braking force needed when restarting the deceleration feedback control from the anti-skid cycle termination time is initialized to the predetermined value by subtracting the proportional-control signal component from the desired braking force memorized value in presence of the increase in the desired deceleration during the anti-skid cycle.

18. The automatic braking force control apparatus as claimed in claim 15, wherein:

the desired braking force needed when restarting the deceleration feedback control from the anti-skid cycle termination time is initialized to the predetermined value by initializing the integral-control signal component of the anti-skid cycle termination time to the desired braking force memorized value and by initializing the proportional-control signal component of the anti-skid cycle termination time to zero in presence of the increase in the desired deceleration during the anti-skid cycle.

19. The automatic braking force control apparatus as claimed in claim 18, wherein:

the proportional-control signal component of the anti-skid cycle termination time is initialized to zero by initializing a proportional-control gain of the proportional-control signal component proportional to the error signal corresponding to the deviation to zero at the anti-skid cycle termination time; and the proportional-control gain, initialized at the anti-skid cycle termination time, gradually recovers to a predetermined design gain until a predetermined recovery time, measured from the anti-skid cycle termination time, expires.

20. The automatic braking force control apparatus as claimed in claim 15, wherein:
a timing of memory for the desired braking force memorized value is timed to coincide with a point of time when a slip rate of the road wheel exceeds a reference slip rate at a skidding point at which a skid of the road wheel starts.

21. The automatic braking force control apparatus as claimed in claim 15, wherein:
a timing of memory for the desired braking force memorized value is timed to coincide with a point of time when a slip rate of the road wheel exceeds a predetermined threshold value less than a reference slip rate at a skidding point at which a skid of the road wheel starts.

22. An automatic braking force control apparatus for an automotive vehicle comprising:
deceleration detection means for detecting an actual deceleration of the vehicle;
braking force adjustment means for adjusting an actual braking force of a road wheel to a desired braking force; and
a brake control unit configured to be electronically connected to the deceleration detection means and the braking force adjustment means, for executing deceleration feedback control and anti-skid control, which are mutually exclusive; the brake control unit comprising:
(a) desired deceleration calculation means for calculating a desired deceleration based on a driver's braking action;
(b) desired braking force calculation means for calculating the desired braking force for the deceleration feedback control, based on a proportional-control signal component proportional to an error signal corresponding to a deviation between the desired deceleration and the actual deceleration, and an integral-control signal component corresponding to an integral of the error signal indicative of the deviation;
(c) anti-skid control means for executing, irrespective of the desired braking force for the deceleration feedback control, an anti-skid cycle including at least a braking-force decrease mode and a braking-force increase mode, for preventing a wheel lock-up condition of the road wheel;
(d) desired braking force memorizing means for memorizing the desired braking force, calculated just before a start time of the anti-skid cycle, as a desired braking force memorized value; and
(e) desired braking force initialization means for initializing the desired braking force needed when restarting the deceleration feedback control from a termination time of the anti-skid cycle to a predetermined value calculated based on the desired braking force memorized value.

* * * * *